(12) United States Patent
Horiuchi

(10) Patent No.: US 6,587,280 B2
(45) Date of Patent: Jul. 1, 2003

(54) ZOOM LENS AND OPTICAL DEVICE USING THE SAME

(75) Inventor: Akihisa Horiuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/851,195

(22) Filed: May 9, 2001

(65) Prior Publication Data

US 2002/0012174 A1 Jan. 31, 2002

(30) Foreign Application Priority Data

May 11, 2000 (JP) ........................... 2000-138906
Feb. 13, 2001 (JP) ........................... 2001-035118

(51) Int. Cl.$^7$ ............................................. G02B 15/14
(52) U.S. Cl. ..................... 359/684; 359/685; 359/687
(58) Field of Search ........................ 359/684, 685, 359/687

(56) References Cited

U.S. PATENT DOCUMENTS

| | | | |
|---|---|---|---|
| 4,720,180 A | 1/1988 | Asano et al. | 359/687 |
| 4,776,679 A | 10/1988 | Kitagishi et al. | 359/686 |
| 4,776,680 A | 10/1988 | Tanaka | 36/87 |
| 4,802,747 A | 2/1989 | Horiuchi | 359/687 |
| 4,810,070 A | 3/1989 | Suda et al. | 359/653 |
| RE32,923 E | 5/1989 | Kreitzer | 359/687 |
| 4,842,386 A | 6/1989 | Kitagishi et al. | 359/687 |
| 4,854,684 A | 8/1989 | Horiuchi | 359/687 |
| 4,859,042 A | 8/1989 | Tanaka | 359/684 |
| 4,892,397 A | 1/1990 | Horiuchi | 359/679 |
| 4,907,866 A | 3/1990 | Kitagishi et al. | 359/654 |
| 4,934,796 A | 6/1990 | Sugiura et al. | 359/683 |
| 4,988,174 A | 1/1991 | Horiuchi et al. | 359/683 |
| 5,011,272 A | 4/1991 | Nakayama et al. | 359/692 |
| 5,050,972 A | 9/1991 | Mukaiya et al. | 359/683 |
| 5,056,900 A | 10/1991 | Mukaiya et al. | 359/676 |
| 5,095,387 A | 3/1992 | Horiuchi | 359/676 |
| 5,134,524 A | 7/1992 | Hamano et al. | 359/687 |
| 5,138,492 A | 8/1992 | Hamano et al. | 359/684 |
| 5,225,937 A | 7/1993 | Horiuchi | 359/688 |
| 5,321,552 A | 6/1994 | Horiuchi et al. | 359/654 |
| 5,341,243 A | 8/1994 | Okuyama et al. | 359/687 |
| 5,353,157 A | 10/1994 | Horiuchi | 359/676 |
| 5,612,825 A | 3/1997 | Horiuchi et al. | 359/687 |
| 5,638,216 A | 6/1997 | Horiuchi et al. | 359/683 |
| 5,739,961 A | 4/1998 | Nakayama et al. | 359/687 |
| 5,754,346 A | 5/1998 | Nakayama et al. | 359/687 |
| 6,081,389 A | 6/2000 | Takayama et al. | 359/680 |
| 6,084,722 A | 7/2000 | Horiuchi | 359/687 |
| 6,166,864 A | 12/2000 | Horiuchi | 359/687 |
| 6,178,049 B1 | 1/2001 | Mukaiya et al. | 359/687 |
| 6,226,130 B1 | 5/2001 | Mukaiya et al. | 359/687 |

FOREIGN PATENT DOCUMENTS

| | | |
|---|---|---|
| JP | 56-114920 | 9/1981 |
| JP | 58-129404 | 8/1983 |
| JP | 58-160913 | 9/1983 |
| JP | 61-258217 | 11/1986 |
| JP | 62-24213 | 2/1987 |
| JP | 62-247316 A | 10/1987 |
| JP | 4-14006 | 1/1992 |
| JP | 4-14007 | 1/1992 |
| JP | 4-301811 | 10/1992 |
| JP | 4-358108 | 12/1992 |
| JP | 5-143178 | 6/1993 |
| JP | 11-242160 | 9/1999 |

*Primary Examiner*—Georgia Epps
*Assistant Examiner*—David N. Spector
(74) *Attorney, Agent, or Firm*—Fitzpatrick, Cella, Harper & Scinto

(57) ABSTRACT

A zoom lens comprises a first lens unit having positive refractive power, a second lens unit having negative refractive power, an aperture stop, a third lens unit having positive refractive power and kept fixed during zooming, a fourth lens unit having positive refractive power, and a fifth lens unit having negative refractive power, which are arranged in this order from an object side. In zooming from a wide-angle end to a telephoto end, the second lens unit is moved toward an image plane side such that a spacing between the first lens unit and the second lens unit is increased, and the aperture stop is also moved.

44 Claims, 13 Drawing Sheets

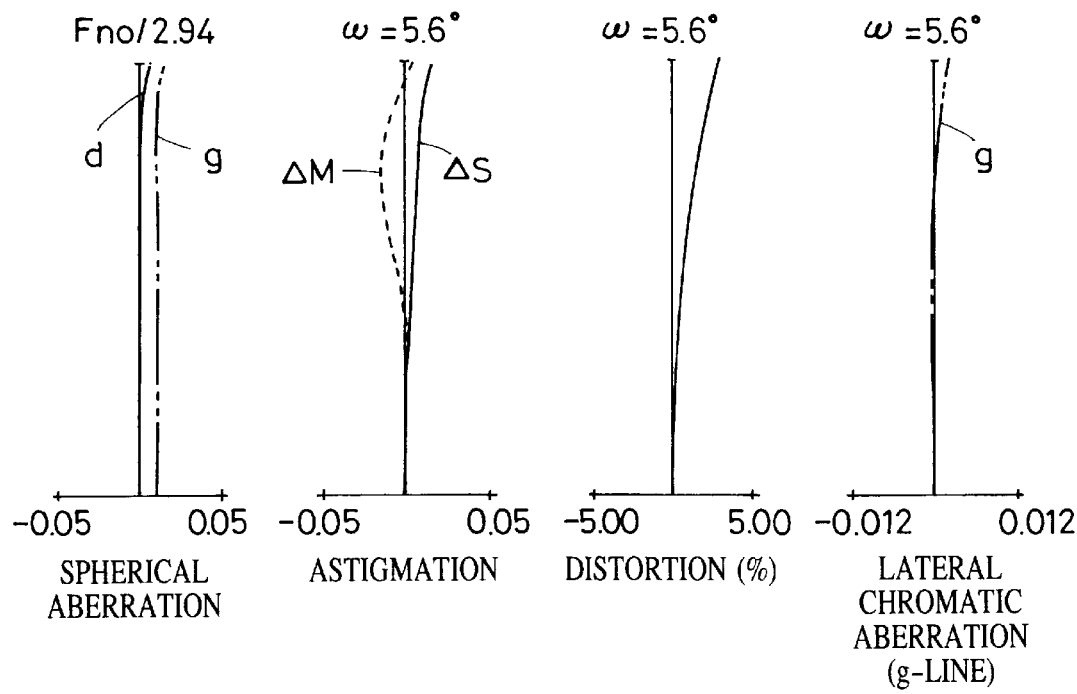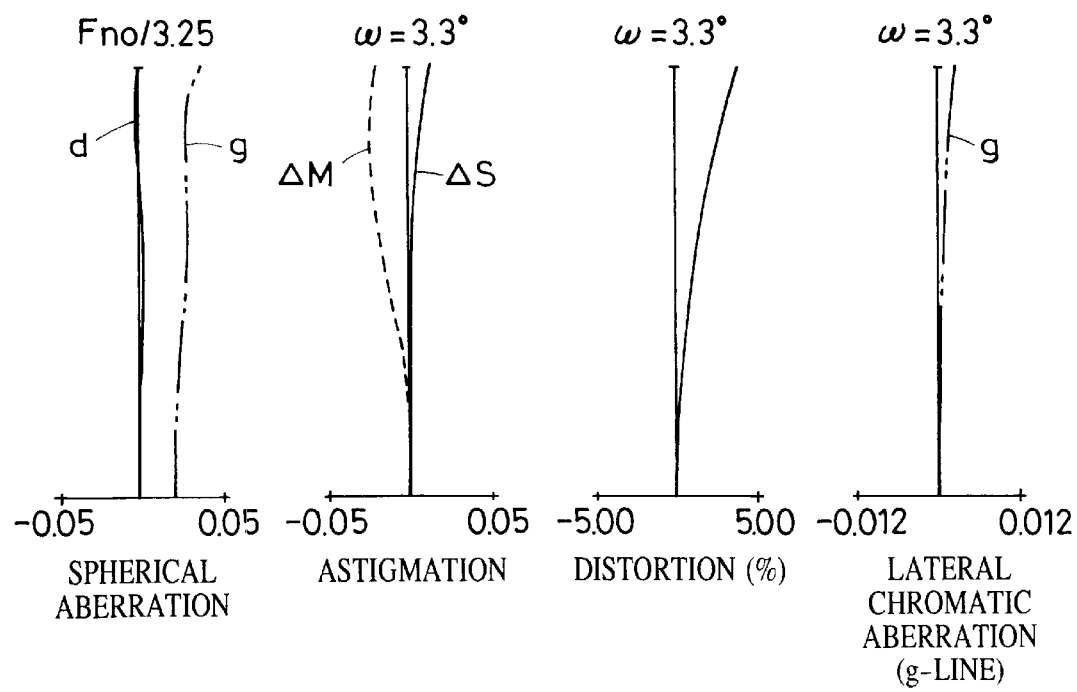

FIG. 5
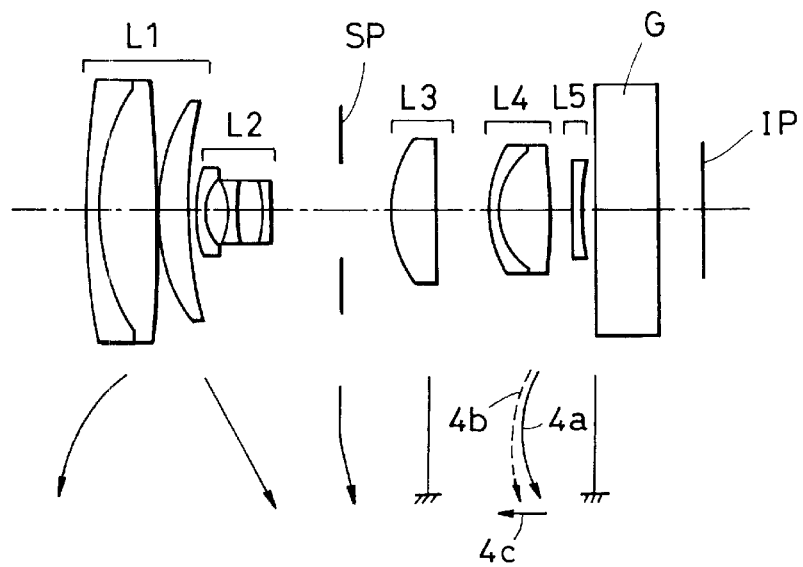
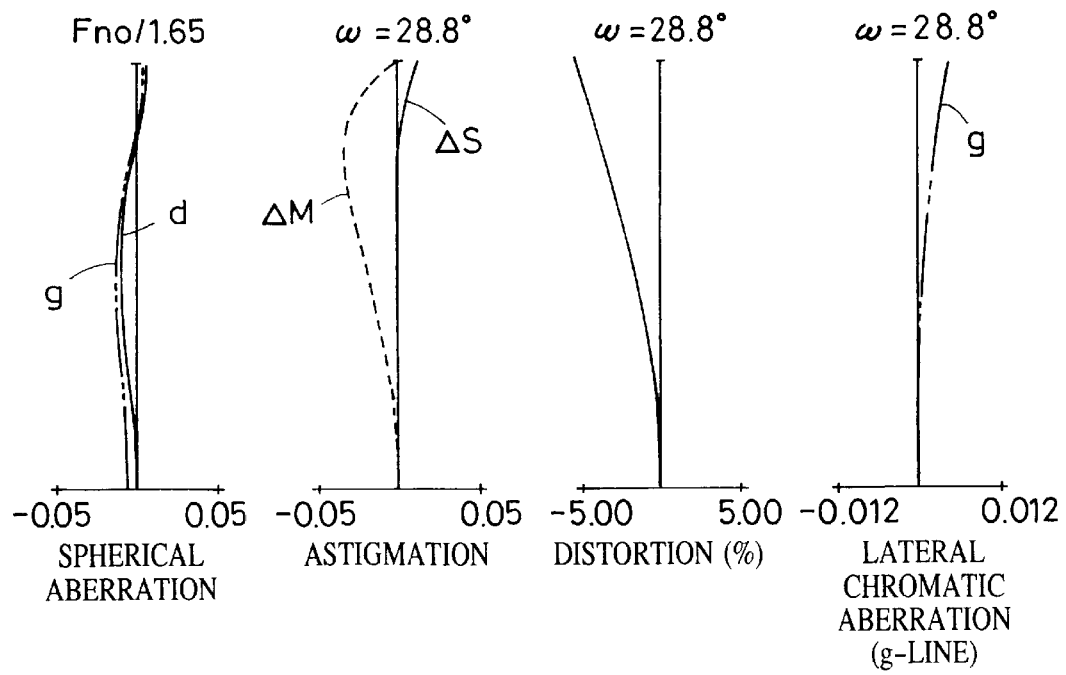
FIG. 6A  FIG. 6B  FIG. 6C  FIG. 6D

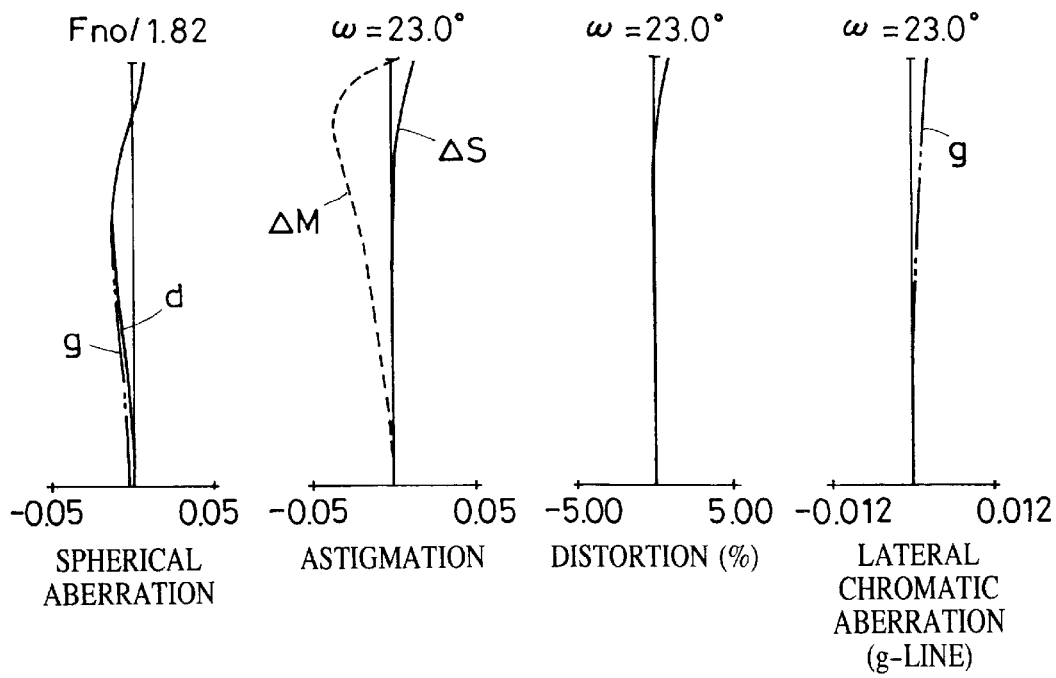
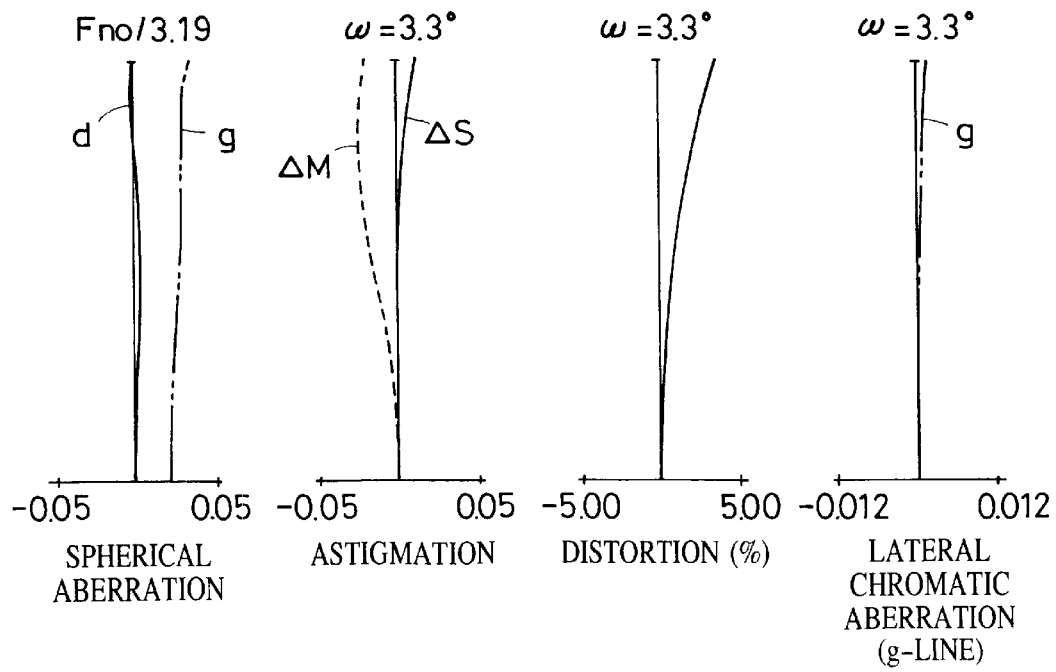

Fno/1.65    ω=28.8°    ω=28.8°    ω=28.8°

-0.05  0.05  -0.05  0.05  -5.00  5.00  -0.012  0.012
SPHERICAL   ASTIGMATION  DISTORTION (%)  LATERAL
ABERRATION                              CHROMATIC
                                        ABERRATION
                                        (g-LINE)

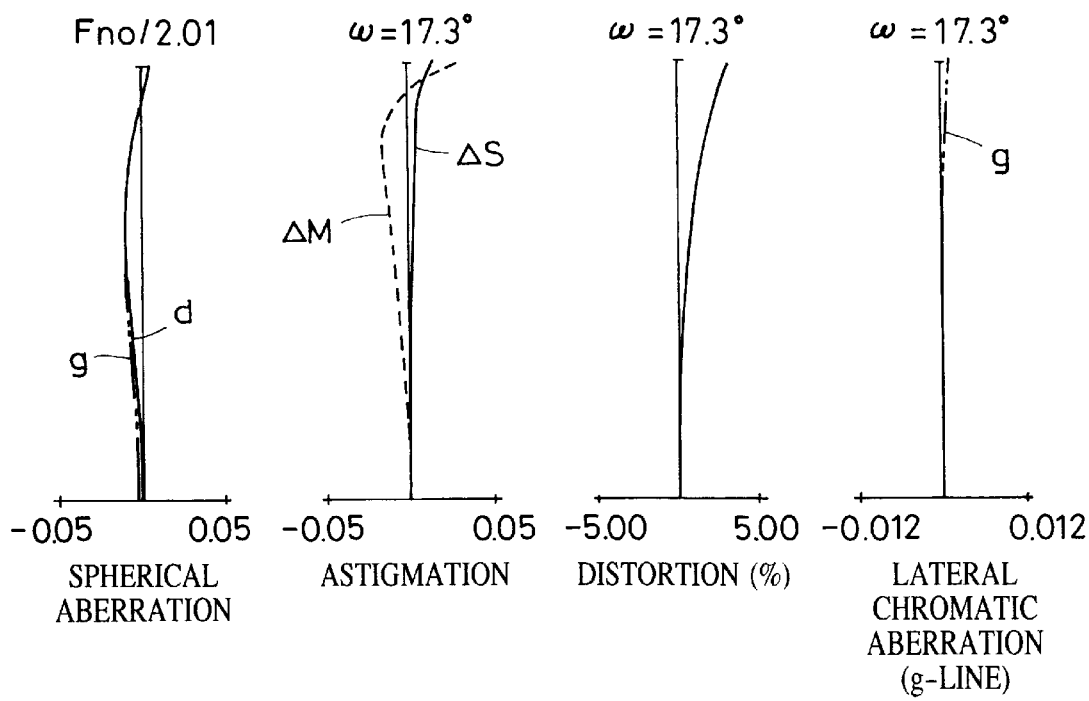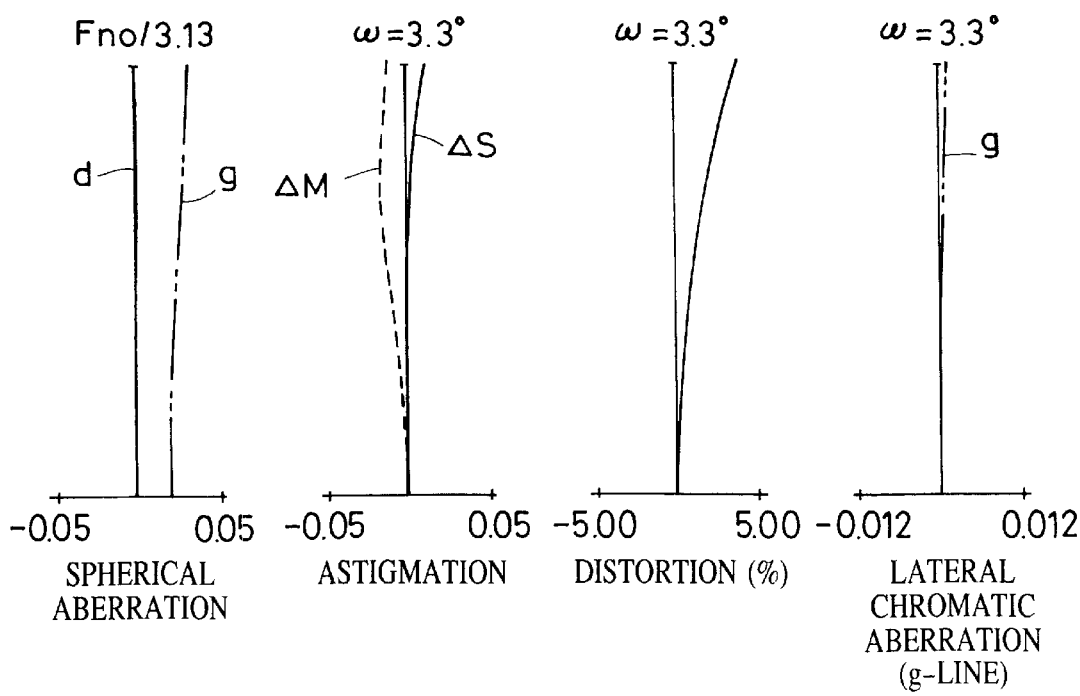

FIG. 13
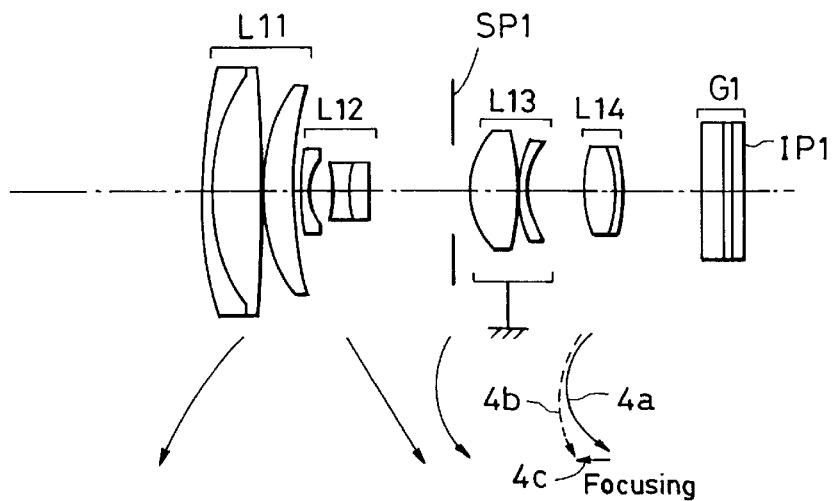
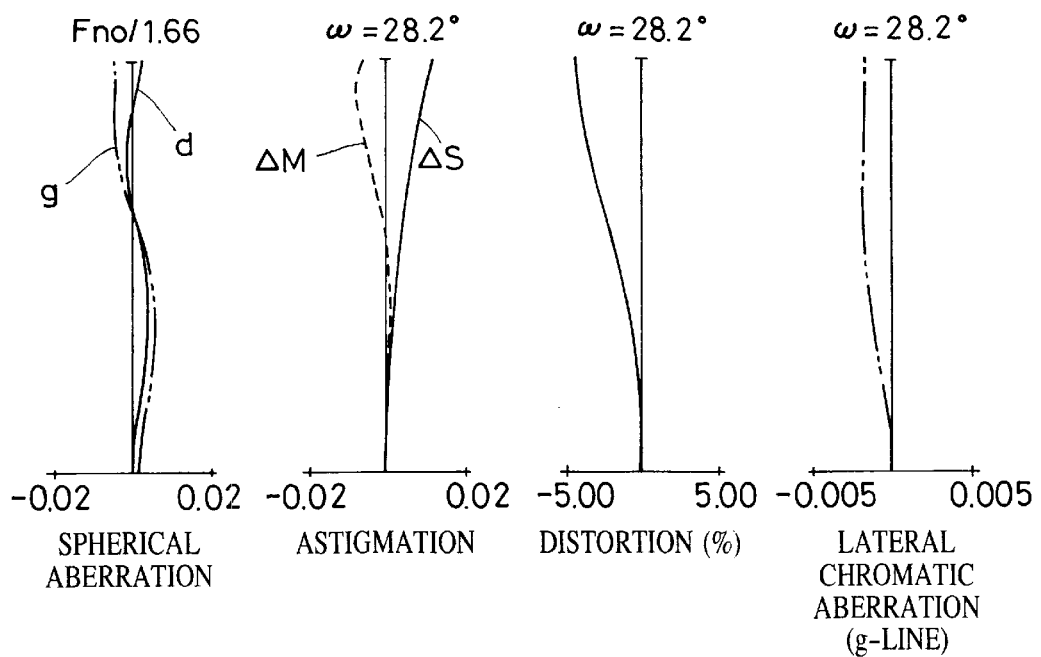
FIG. 14A    FIG. 14B    FIG. 14C    FIG. 14D

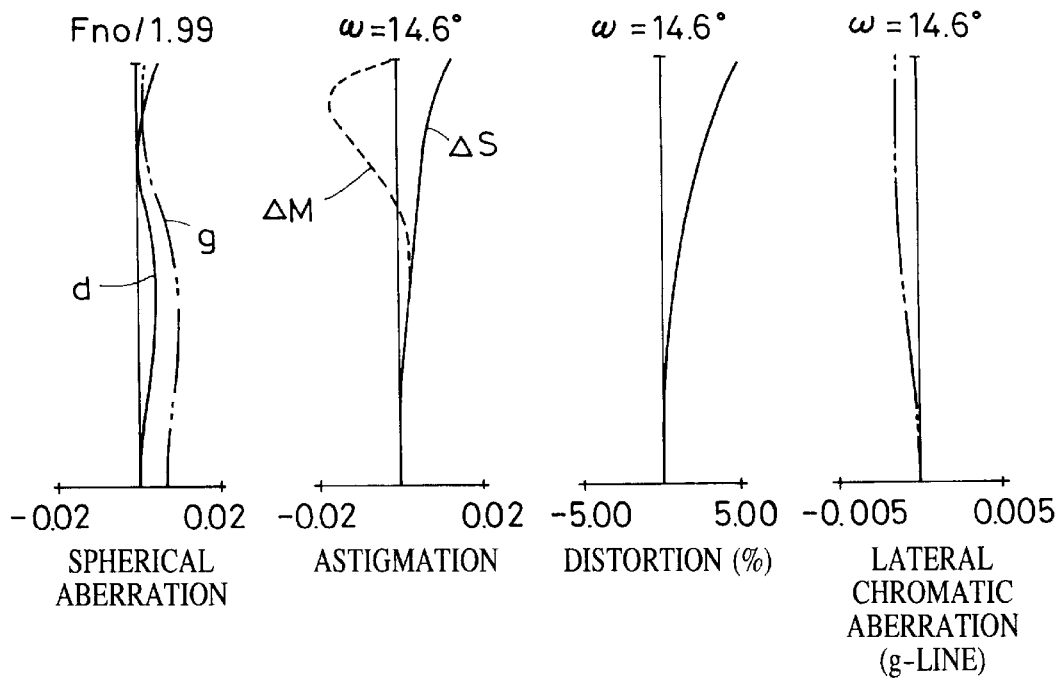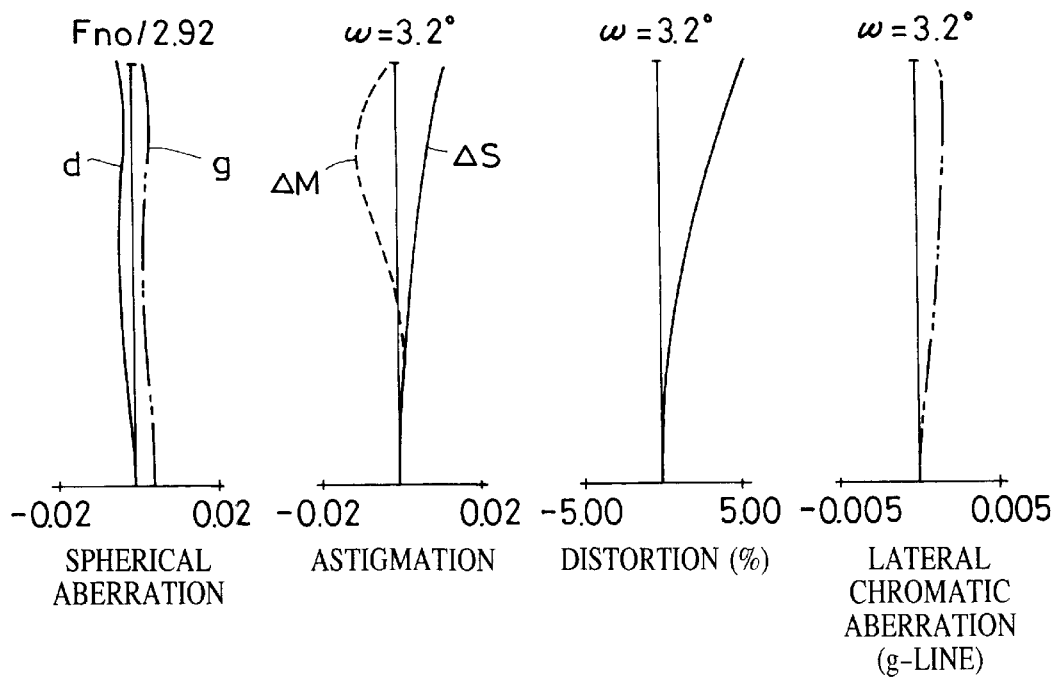

FIG. 17
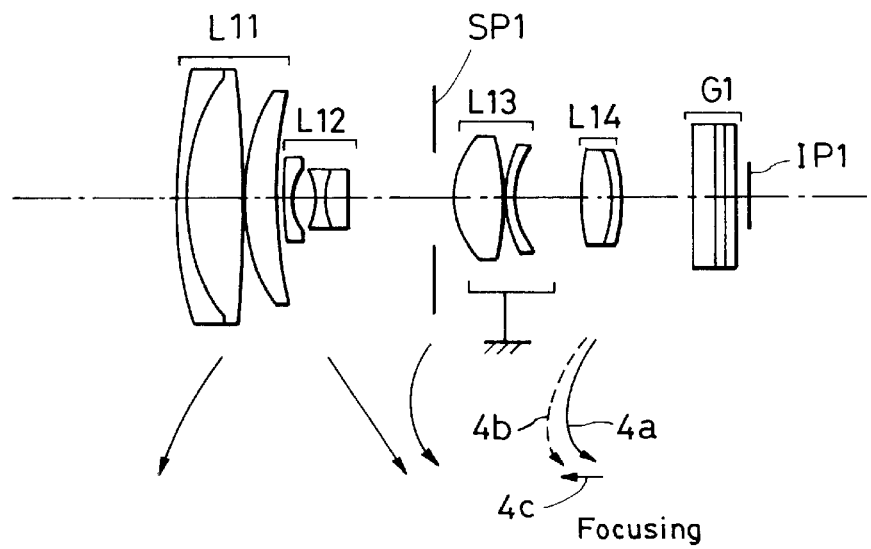
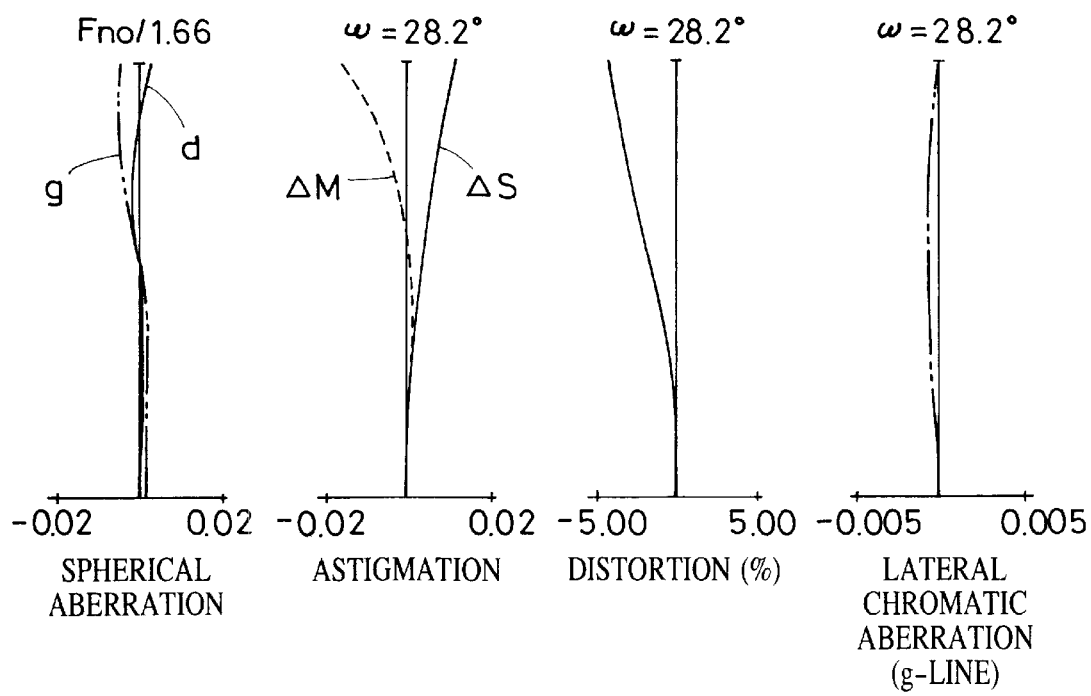
FIG. 18A  FIG. 18B  FIG. 18C  FIG. 18D
SPHERICAL ABERRATION
ASTIGMATION
DISTORTION (%)
LATERAL CHROMATIC ABERRATION (g-LINE)

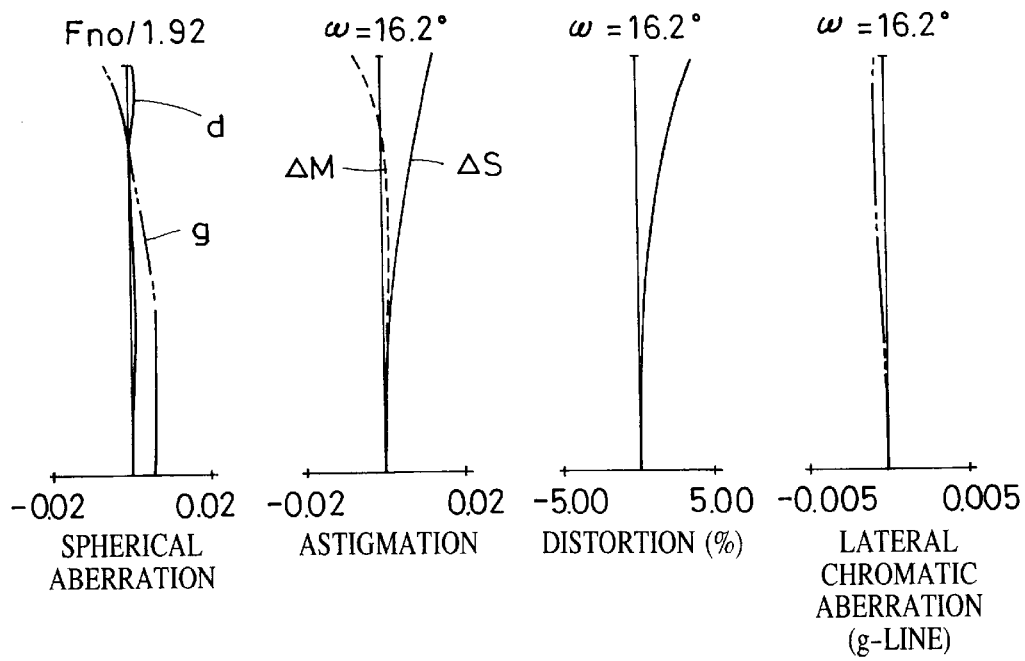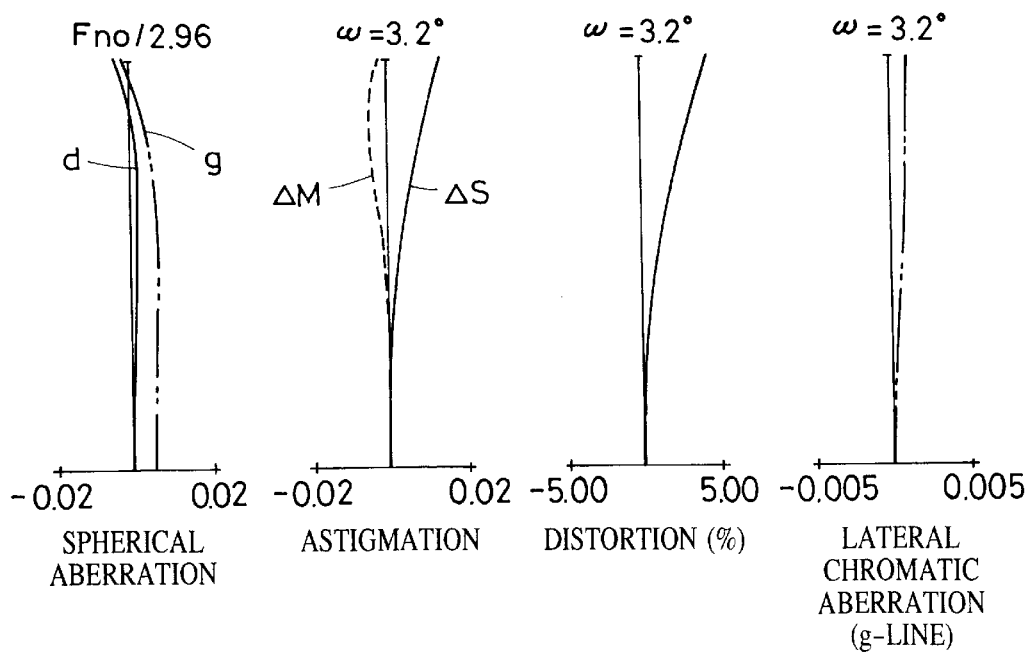

FIG. 21
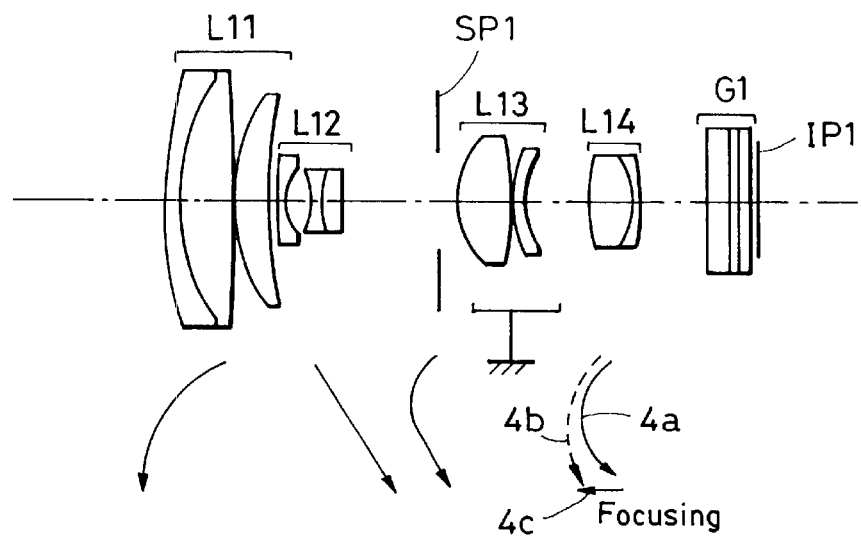
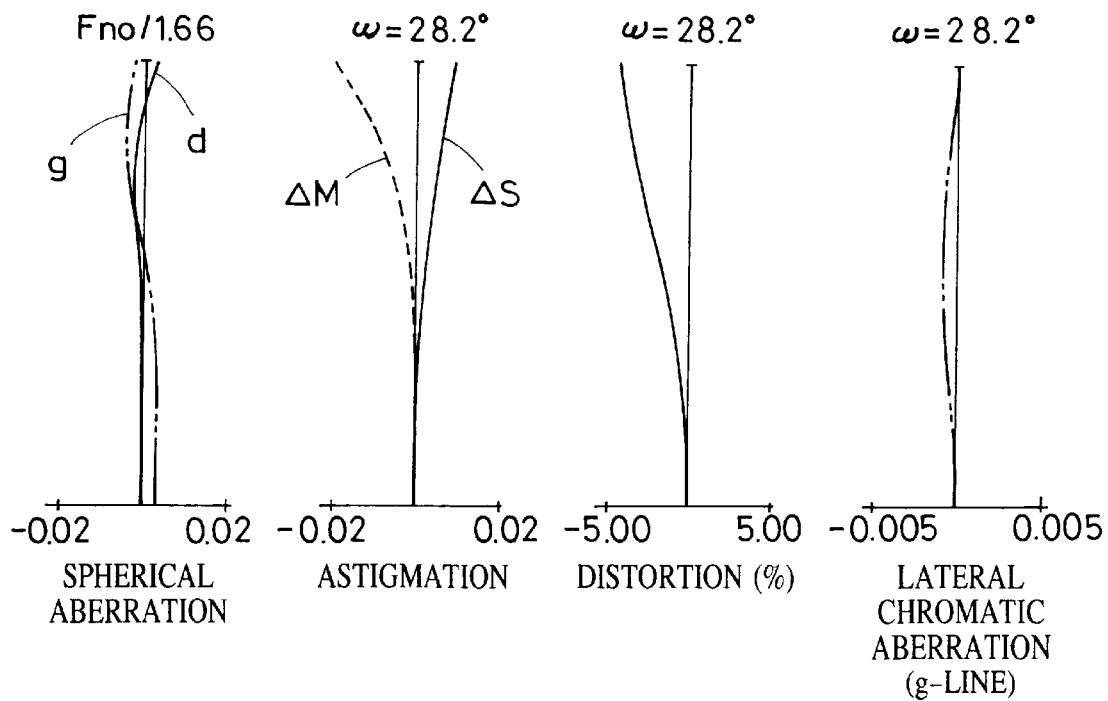
FIG. 22A   FIG. 22B   FIG. 22C   FIG. 22D
Fno/1.66     ω=28.2°     ω=28.2°     ω=28.2°
SPHERICAL   ASTIGMATION   DISTORTION (%)   LATERAL
ABERRATION                                  CHROMATIC
                                            ABERRATION
                                            (g-LINE)

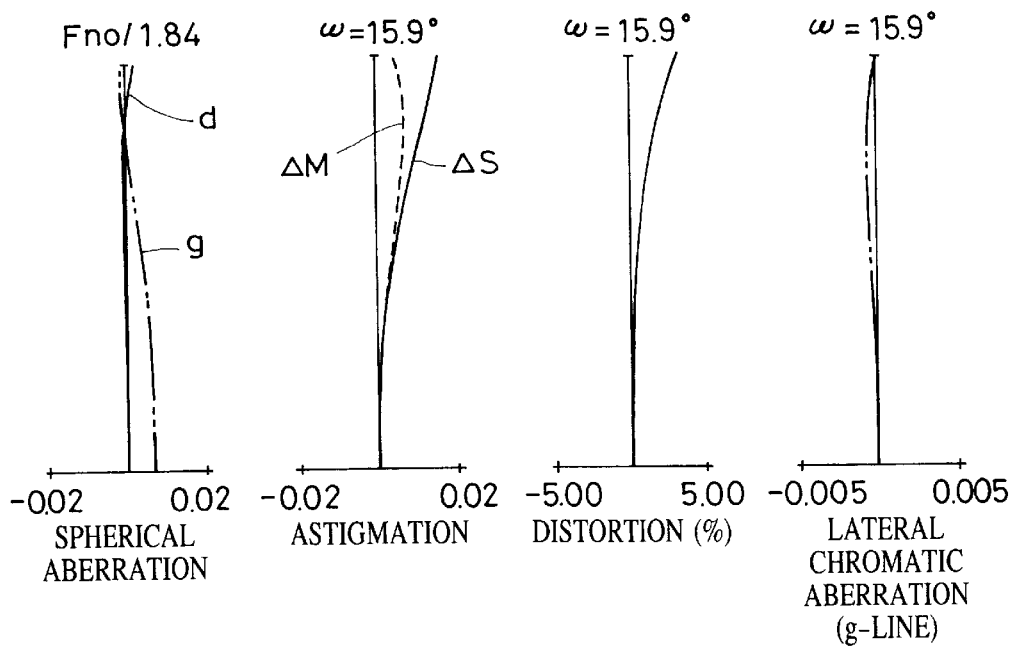
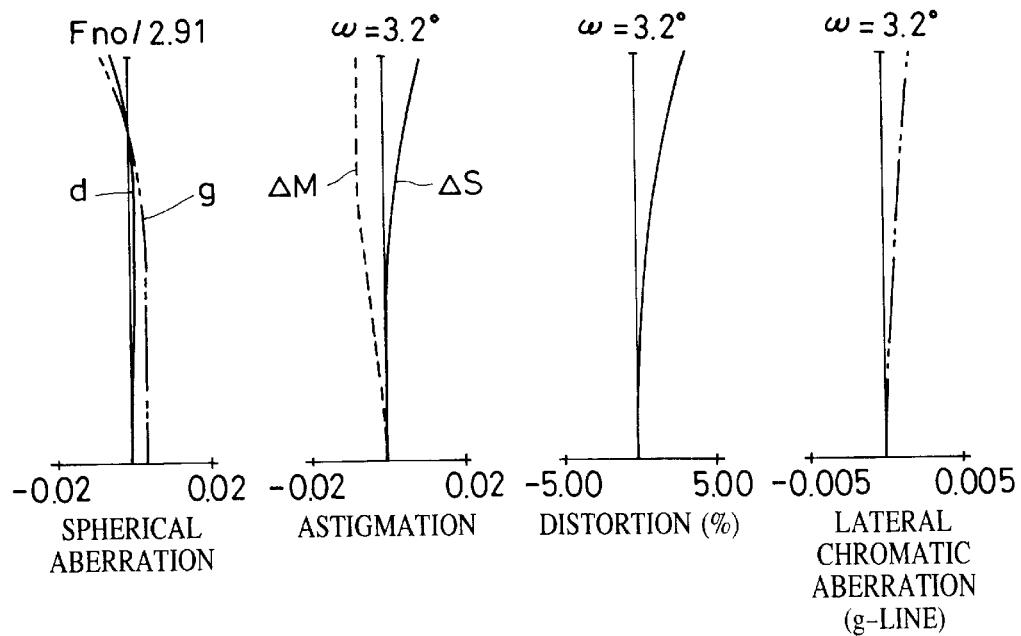

ZOOM LENS AND OPTICAL DEVICE USING THE SAME

BACKGROUND OF THE INVENTION

1. Field of the Invention

The present invention relates to a zoom lens and an optical device using the zoom lens, which is particularly suitable for use in optical equipment such as electronic cameras, including a video camera and a digital still camera, and film cameras. Also, the present invention relates to a zoom lens, which has a short overall length and a large aperture ratio with the F-number being about 1.6 at the wide-angle end while it has a zoom magnification ratio as high as on the order of 10, and an optical device using the zoom lens.

2. Description of the Related Art

Hitherto, a zoom lens having a relatively small overall lens system and a relatively high zoom magnification ratio has been proposed in, e.g., Japanese Patent Laid-Open Nos. 56-114920 and 58-160913 (U.S. Pat. No. 4,720,180). This zoom lens comprises four lens units, i.e., a first lens unit having positive refractive power, a second lens unit having negative refractive power, a third lens unit having positive refractive power, and a fourth lens unit having positive refractive power, which are arranged in this order from the object side. The first, second and fourth lens units are moved for zooming. With such an arrangement, a relatively high zoom magnification ratio is provided while the overall lens system is of a relatively small size.

Japanese Patent Laid-Open Nos. 62-24213 (U.S. Pat. No. 4,859,042) and 62-247316 propose a zoom lens similarly comprising four lens units, i.e., a first lens unit having positive refractive power, a second lens unit having negative refractive power, a third lens unit having positive refractive power, and a fourth lens unit having positive refractive power, which are arranged in this order from the object side. In this zoom lens, however, the second lens unit is moved for zooming and the fourth lens unit is moved to compensate for a shift of an image plane (field shift) upon zooming. Further, the fourth lens unit also serves for focusing.

Also, Japanese Patent Laid-Open No. 4-14007 (U.S. Pat. No. 5,134,524) discloses a zoom lens comprising a first lens unit having positive refractive power, a second lens unit having negative refractive power, an aperture stop, a third lens unit having positive refractive power, and a fourth lens unit having positive refractive power, which are arranged in this order from the object side. For zooming from the wide-angle end to the telephoto end, the first lens unit is moved toward the object side and the second lens unit is moved toward the image (plane) side. The fourth lens unit is moved for zooming and focusing. Further, the aperture stop is moved toward the image side for zooming from the medium focal length to the telephoto end.

Japanese Patent Laid-open Nos. 58-129404 and 61-258217 (U.S. Pat. No. 4,776,680) disclose a zoom lens comprising five lens units, i.e., a first lens unit having positive refractive power, a second lens unit having negative refractive power, a third lens unit having positive refractive power, a fourth lens unit having positive refractive power, and a fifth lens unit having negative refractive power, which are arranged in this order from the object side. The fifth lens unit or a plurality of lens units including the fifth lens unit is moved for focusing.

Japanese Patent Laid-Open No. 4-301811 discloses a zoom lens comprising five lens units, i.e., a first lens unit having positive refractive power, a second lens unit having negative refractive power, a third lens unit having positive refractive power, a fourth lens unit having positive refractive power, and a fifth lens unit having negative refractive power, which are arranged in this order from the object side, with an aperture stop situated between the second and third lens units. For zooming from the wide-angle angle end to the telephoto end, the first lens unit is moved toward the object side, the second lens unit is moved toward the image side, and the aperture stop is kept fixed. The fourth lens unit is moved not only to compensate for shift of an image plane upon zooming, but also to serve for focusing.

U.S. Reissue Pat. No. 32,923 discloses a zoom lens comprising a first positive lens unit, a second negative lens unit, an aperture stop, a third positive lens unit, and a fourth positive lens unit, which are arranged in this order from the object side. For zooming, the first and fourth lens units are moved in the same direction while the stop is kept fixed.

Japanese Patent Laid-Open Nos. 4-14006 (U.S. Pat. No. 5,134,524) and 4-358108 (U.S. Pat. No. 5,341,243) disclose a zoom lens comprising a first lens unit having positive refractive power, a second lens unit having negative refractive power, an aperture stop, a third lens unit having positive refractive power, and a fourth lens unit having positive refractive power, which are arranged in this order from the object side. For zooming from the wide-angle end to the telephoto end, the first lens unit is moved toward the object side and the second lens unit is moved toward the image side. The fourth lens unit is moved for zooming and focusing, while the aperture stop is always kept fixed during the zooming.

Japanese Patent Laid-Open No. 11-242160 discloses a zoom lens comprising a first lens unit having positive refractive power, a second lens unit having negative refractive power, a third lens unit having positive refractive power, and a fourth lens unit having positive refractive power, which are arranged in this order from the object side. For zooming from the wide-angle end to the telephoto end, the first and fourth lens units are moved toward the object side and the second lens unit is moved toward the image side. The third lens unit and an aperture stop are always kept fixed during the zooming.

Moreover, Japanese Patent Laid-Open No. 5-143178 discloses a zoom lens comprising a first lens unit having positive refractive power, which is kept fixed during zooming, a second lens unit having negative refractive power, an aperture stop, a third lens unit having positive refractive power, and a fourth lens unit constituted by a single lens having positive refractive power, which are arranged in this order from the object side. The aperture stop is moved for zooming.

Recently, there has been a demand for a zoom lens used in optical equipment, such as a single-lens reflex camera and a video camera, which has a zoom magnification ratio as high as on the order of 10 and also has a small overall lens system.

In general, to obtain a zoom lens having a high zoom magnification ratio, a short overall lens system and high optical performance over a full zooming range, a lens arrangement, a refractive power of each lens unit, etc. must be properly set.

Unless, for example, moving conditions of each lens unit in zooming, a refractive power of each lens unit, a lens arrangement of each zooming lens unit, a selection of one or more lens units for focusing and a lens arrangement of each selected lens unit, an optical action of an aperture stop, etc.

are properly set, aberrations that occur upon zooming and focusing increase to such an extent that it is difficult to obtain a high-quality image while realizing a high zoom magnification ratio.

In a zoom lens, it is a generally known principle that intensifying refractive power of each lens unit is effective to increase a zoom magnification ratio and shorten the overall lens system, because the amount by which each lens unit must be moved for obtaining a predetermined zoom magnification ratio is reduced correspondingly.

Simply intensifying refractive power of each lens unit, however, raises a problem that variations of aberrations upon zooming are increased and it is difficult to obtain high optical performance over a full zooming range.

Meanwhile, by employing rear focusing in a zoom lens, advantageous features result, for example, in that the size of an overall lens system is reduced, more rapid focusing is realized, and macro (close-up) shooting is facilitated.

However, variations of aberrations upon zooming are increased, which makes it very difficult to obtain high optical performance over the entire range of a distance to an object, ranging from an infinite object to a proximity object, while realizing a size reduction of the overall lens system.

SUMMARY OF THE INVENTION

Accordingly, it is an object of the present invention to provide a small-sized zoom lens and an optical device using the zoom lens. By properly setting moving conditions of predetermined lens units in zooming, a refractive power and a lens arrangement of each lens unit, etc., a zoom lens having a short overall lens system and having high optical performance over a full zooming range with a simplified lens arrangement while having a high zoom magnification ratio is obtained.

Another object of the present invention is to provide a zoom lens in which the size of the overall lens system is reduced in spite of a zoom magnification ratio being as high as on the order of 10. Still another object of the present invention is to provide a zoom lens which has high optical performance and comprises fewer lenses while having a large aperture ratio, with the F-number being about 1.6.

To achieve the above objects, according to a first aspect of the present invention, a zoom lens comprises a first lens unit having positive refractive power; a second lens unit having negative refractive power; an aperture stop; a third lens unit having positive refractive power and kept fixed during zooming; a fourth lens unit having positive refractive power; and a fifth lens unit having negative refractive power, which are arranged in this order from the object side. In zooming from the wide-angle end to the telephoto end, the second lens unit is moved toward the image plane side such that a spacing between the first lens unit and the second lens unit is increased, and the aperture stop is also moved.

Preferably, the first lens unit is moved toward the object side in the zooming from the wide-angle end to the telephoto end.

Preferably, the fourth lens unit is moved in compensating for shift of an image plane upon zooming and in focusing.

Preferably, the fourth lens unit is moved to follow a locus convex toward the object side in zooming.

Preferably, the aperture stop is moved toward the image plane side in the zooming from the wide-angle end to the telephoto end.

Preferably, in the zooming from the wide-angle end to the telephoto end, the aperture stop is moved toward the image plane side in the range from a medium position of a zooming range to the telephoto end.

Preferably, in the zooming from the wide-angle end to the telephoto end, the aperture stop is moved to follow a locus that is located nearest to the object side at a medium position of a zooming range.

Preferably, assuming that distances between the second lens unit and the aperture stop at a zoom position at which the aperture stop is positioned farthest from the third lens unit along an optical axis and the telephoto end are respectively L2s, L2t, and distances between the aperture stop and the third lens unit at the zoom position and the telephoto end are respectively Ls3, L3t, the following conditional formula is satisfied:

$$0.4 < (L2s - L2t)/(Ls3 - L3t) < 1.3$$

Preferably, assuming that the focal lengths of an overall lens system at the wide-angle end and the telephoto end are respectively fw, ft, the focal length of the second lens unit is f2, and fA is defined as given below;

$$fA = \sqrt{fw \cdot ft}$$

the following conditional formula is satisfied:

$$0.19 < |f2/fA| < 0.30$$

Preferably, assuming that the distance from a first lens surface on the object side to a paraxial image plane in a state of focusing on an infinite object at the wide-angle end is L on condition that the distance from a final lens surface to the image plane is calculated in terms of air, the focal lengths of an overall lens system at the wide-angle end and the telephoto end are respectively fw, ft, and fA is defined as given below;

$$fA = \sqrt{fw \cdot ft}$$

the following conditional formula is satisfied:

$$2.22 < L/fA < 3.36$$

Preferably, assuming the amounts by which the first lens unit and the second lens unit are moved in the zooming from the wide-angle end to the telephoto end are respectively S1, S2, the following conditional formula is satisfied:

$$0.6 < S1/S2 < 1.2$$

Preferably, the fifth lens unit is fixed during zooming.

Preferably, the third lens unit is moved to have a motion component in a direction perpendicular to an optical axis.

Preferably, the second lens unit comprises a meniscus-shaped negative lens having a concave surface faced toward the image plane side, a negative lens having both concave lens surfaces, and a cemented lens, which are arranged in this order from the object side, the cemented lens being made of a positive lens, which has a more convex surface faced toward the object side than that faced toward the image plane side, and a negative lens, which are cemented to each other.

Preferably, the second lens unit has at least one aspherical surface.

Preferably, assuming that the average Abbe's numbers of materials of a positive lens and a negative lens in the second lens unit are respectively νp, νn, at least one of the following conditional formulae is satisfied for the average Abbe's number:

20<νp<35

36<νn<65

Preferably, assuming that the average value of refractive index of material of a negative lens in the second lens unit is Nn, the following conditional formula is satisfied:

1.80<Nn<1.96

Preferably, assuming that the radius of curvature of an i-th lens surface in the second lens unit counted from the object side is RR2i, the following conditional formula is satisfied:

0.60<|R22/R23|<0.82

To achieve the above objects, according to a second aspect of the present invention, a zoom lens comprises a first lens unit having positive refractive power; a second lens unit having negative refractive power; an aperture stop; a third lens unit having positive refractive power and not moving for zooming; and a fourth lens unit having positive refractive power and including at least one negative lens. In zooming from the wide-angle end to the telephoto end, the second lens unit is moved toward the image plane side such that a spacing between the first lens unit and the second lens unit is increased, and the aperture stop is also moved.

Preferably, assuming that the shortest exit pupil position of an overall lens system in the zooming from the wide-angle end to the telephoto end and in focusing from an infinite object to a proximity object is EP, the focal length of the overall lens system at the wide-angle end is fw, the effective size of an image pickup device is LD, and the half angle ωw of view is expressed by;

$$\omega w = \tan^{-1} \frac{LD}{2fw}$$

the following conditional formula is satisfied:

0<|(fw·tan ωw)/EP|<0.13

Preferably, the first lens unit is moved toward the object side in the zooming from the wide-angle end to the telephoto end.

Preferably, the fourth lens unit is moved in compensating for shift of an image plane upon zooming and in focusing.

Preferably, the fourth lens unit is moved to follow a locus convex toward the object side in zooming.

Preferably, in the zooming from the wide-angle end to the telephoto end, the aperture stop is moved toward the image plane side in the range from a medium position of a zooming range to the telephoto end.

Preferably, in the zooming from the wide-angle end to the telephoto end, the aperture stop is moved to follow a locus that is located nearest to the object side at a medium position of a zooming range.

Preferably, in the zooming from the wide-angle end to the telephoto end, the aperture stop is moved to follow the same locus as that of the first lens unit in the range from the wide-angle end to a medium position of a zooming range, and to follow the same locus as that of the second lens unit in the range from the medium position of the zooming range to the telephoto end.

Preferably, assuming that the focal lengths of an overall lens system at the wide-angle end and the telephoto end are respectively fw, ft, the focal length of the second lens unit is f2, and fA is defined as given below;

$$fA = \sqrt{fw \cdot ft}$$

the following conditional formula is satisfied:

0.1<|f2/fA|<0.29

Preferably, assuming that the focal length of an overall lens system at the wide-angle end is fw and the spacing between the principal points of the third lens unit and the fourth lens unit that results in focusing on an infinite object at the telephoto end is e3T, the following conditional formula is satisfied:

1.79<e3T/fw<2.76

Preferably, assuming that the focal length of an i-th lens unit is fi, the following conditional formula is satisfied:

0.63<f3/f4<1.02

Preferably, assuming that distances between the second lens unit and the aperture stop at a zoom position at which the aperture stop is positioned farthest from the third lens unit along an optical axis and the telephoto end are respectively L2s, L2t, and distances between the aperture stop and the third lens unit at the zoom position and the telephoto end are respectively Ls3, L3t, the following conditional formula is satisfied:

0.2<(L2s−L2t)/(Ls3−L3t)<0.9

Preferably, assuming the amounts by which the first lens unit and the second lens unit are moved in the zooming from the wide-angle end to the telephoto end are respectively M1, M2, the following conditional formula is satisfied:

0.5<M1/M2<1.2

Preferably, the second lens unit comprises a meniscus-shaped negative lens having a concave surface faced toward the image plane side, and a cemented lens made of a negative lens having both concave lens surfaces and a positive lens having a convex surface faced toward the object side, which are arranged in this order from the object side.

Preferably, the second lens unit has at least one aspherical surface.

Preferably, assuming that for an i-th lens surface in the second lens unit counted from the object side, R2i represents the radius of curvature when the lens surface is a spherical surface and the radius of paraxial curvature when the lens surface is an aspherical surface, the following conditional formula is satisfied:

$$0.52<|R22/R23|<0.92$$

Preferably, the third lens unit comprises a positive lens and a negative lens having a powerful concave surface faced toward the image plane side, which are arranged in order from the object side.

Preferably, the third lens unit or a part of the lenses of the third lens unit is moved to have a motion component in a direction perpendicular to an optical axis.

To achieve the above objects, according to a third aspect of the present invention, an optical device comprises a zoom lens comprising a first lens unit having positive refractive power, a second lens unit having negative refractive power, an aperture stop, a third lens unit having positive refractive power and kept fixed during zooming, a fourth lens unit having positive refractive power, and a fifth lens unit having negative refractive power, which are arranged in this order from the object side, the second lens unit being moved toward the image plane side such that a spacing between the first lens unit and the second lens unit is increased, and the aperture stop also being moved in zooming from the wide-angle end to the telephoto end; and a housing for supporting the zoom lens.

To achieve the above objects, according to a fourth aspect of the present invention, an optical device comprises a zoom lens comprising a first lens unit having positive refractive power, a second lens unit having negative refractive power, an aperture stop, a third lens unit having positive refractive power and not moving for zooming, and a fourth lens unit having positive refractive power and including at least one negative lens, the second lens unit being moved toward the image plane side such that a spacing between the first lens unit and the second lens unit is increased, and the aperture stop also being moved in zooming from the wide-angle end to the telephoto end; and a housing for supporting the zoom lens.

Preferably, assuming that the shortest exit pupil position of an overall lens system in the zooming from the wide-angle end to the telephoto end and in focusing from an infinite object to a proximity object is EP, the focal length of the overall lens system at the wide-angle end is fw, the effective size of an image pickup device is LD, and the half angle ωw of view is expressed by;

$$\omega w = \tan^{-1} \frac{LD}{2fw}$$

the following conditional formula is satisfied:

$$0<|(fw\cdot\tan \omega w)/EP|<0.13$$

Further objects, features and advantages of the present invention will become apparent from the following description of the preferred embodiments with reference to the attached drawings.

BRIEF DESCRIPTION OF THE DRAWINGS

FIGS. 3A, 3B, 3C, and 3D represent aberrations at the medium zoom position in Numerical Value Example 1 of the present invention;

FIGS. 4A, 4B, 4C, and 4D represent aberrations at the telephoto end in Numerical Value Example 1 of the present invention;

FIG. 5 is a sectional view of a lens represented by Numerical Value Example 2 of the present invention;

FIGS. 6A, 6B, 6C, and 6D represent aberrations at the wide-angle end in Numerical Value Example 2 of the present invention;

FIGS. 7A, 7B, 7C, and 7D represent aberrations at the medium zoom position in Numerical Value Example 2 of the present invention;

FIGS. 8A, 8B, 8C, and 8D represent aberrations at the telephoto end in Numerical Value Example 2 of the present invention;

FIGS. 11A, 11B, 11C, and 11D represent aberrations at the medium zoom position in Numerical Value Example 3 of the present invention;

FIGS. 12A, 12B, 12C, and 12D represent aberrations at the telephoto end in Numerical Value Example 3 of the present invention;

FIG. 13 is a sectional view of a lens represented by Numerical Value Example 4 of the present invention;

FIGS. 14A, 14B, 14C, and 14D represent aberrations at the wide-angle end in Numerical Value Example 4 of the present invention;

FIGS. 15A, 15B, 15C, and 15D represent aberrations at the medium zoom position in Numerical Value Example 4 of the present invention;

FIGS. 16A, 16B, 16C, and 16D represent aberrations at the telephoto end in Numerical Value Example 4 of the present invention;

FIG. 17 is a sectional view of a lens represented by Numerical Value Example 5 of the present invention;

FIGS. 18A, 18B, 18C, and 18D represent aberrations at the wide-angle end in Numerical Value Example 5 of the present invention;

FIGS. 19A, 19B, 19C, and 19D represent aberrations at the medium zoom position in Numerical Value Example 5 of the present invention;

FIGS. 20A, 20B, 20C, and 20D represent aberrations at the telephoto end in Numerical Value Example 5 of the present invention;

FIG. 21 is a sectional view of a lens represented by Numerical Value Example 6 of the present invention;

FIGS. 22A, 22B, 22C, and 22D represent aberrations at the wide-angle end in Numerical Value Example 6 of the present invention;

FIGS. 23A, 23B, 23C, and 23D represent aberrations at the medium zoom position in Numerical Value Example 6 of the present invention;

FIGS. 24A, 24B, 24C, and 24D represent aberrations at the telephoto end in Numerical Value Example 6 of the present invention;

DESCRIPTION OF THE PREFERRED EMBODIMENTS

As used throughout this disclosure, including the drawings, d denotes a spectral d-line, g denotes a spectral g-line, ΔM denotes a meridional image surface, and ΔS denotes a sagittal image surface. A first embodiment of the present invention will now be described below.

Figure 1:
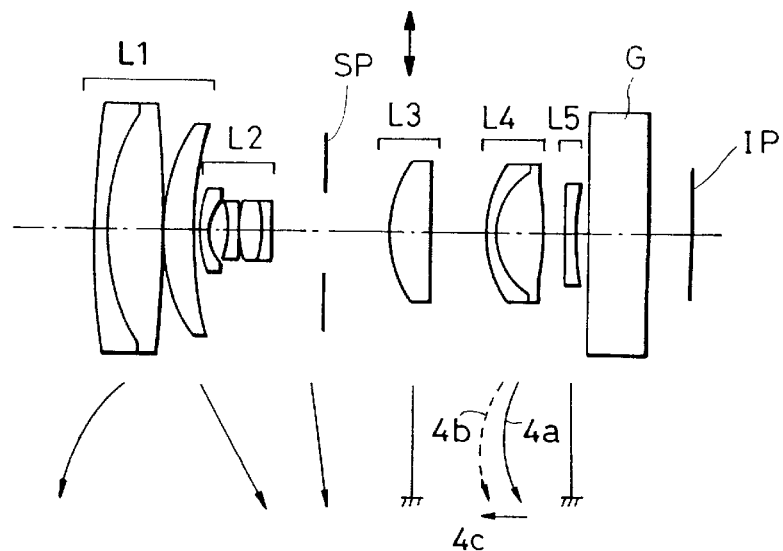
FIG. 1 is a sectional view of a lens represented by Numerical Value Example 1 of the present invention.
Figure 2:
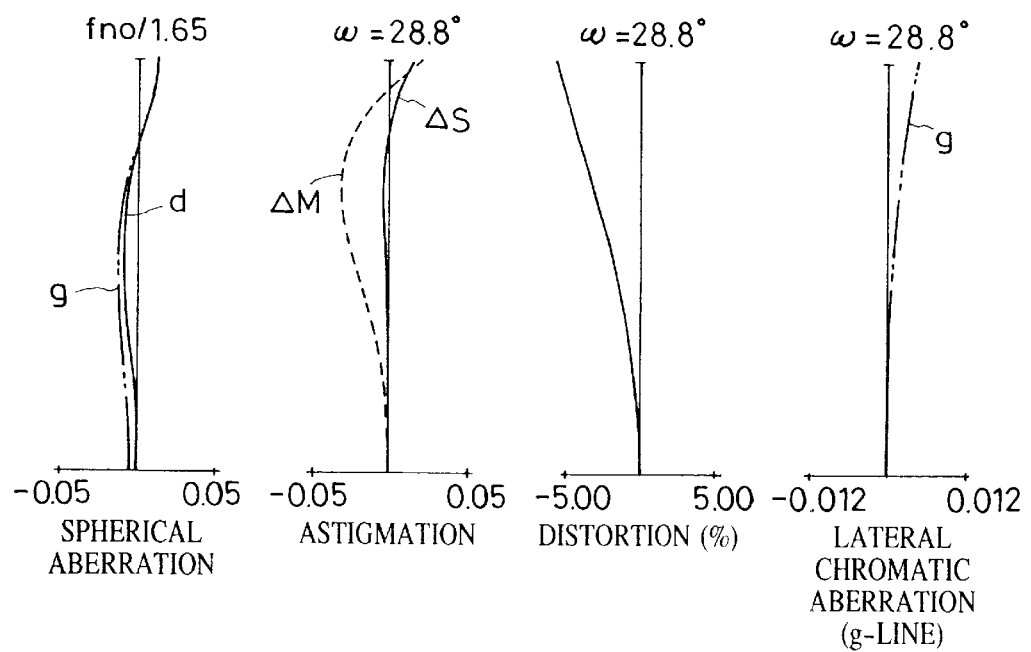
FIGS. 2A, 2B, 2C, and 2D represent aberrations at the wide-angle end in Numerical Value Example 1 of the present invention.
Figure 9:
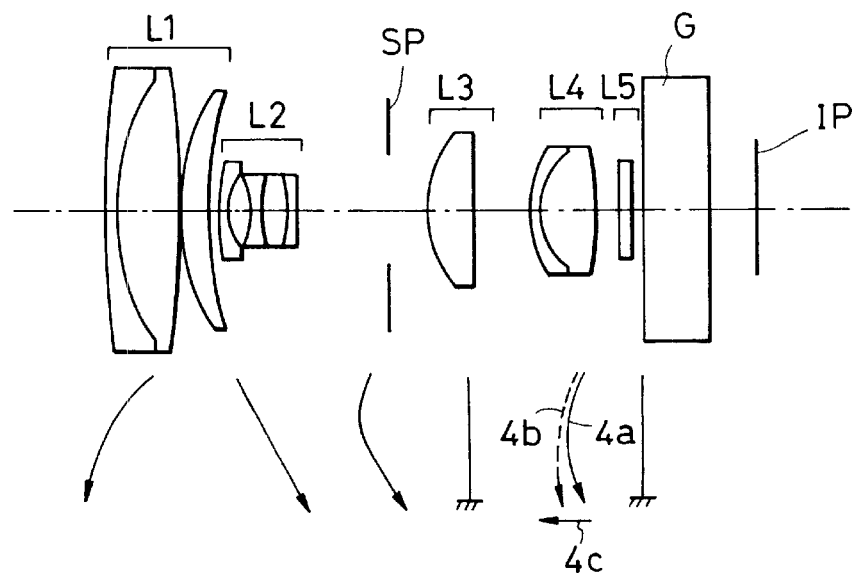
FIG. 9 is a sectional view of a lens represented by Numerical Value Example 3 of the present invention.
Figures 10A, 10B, 10C, 10D:
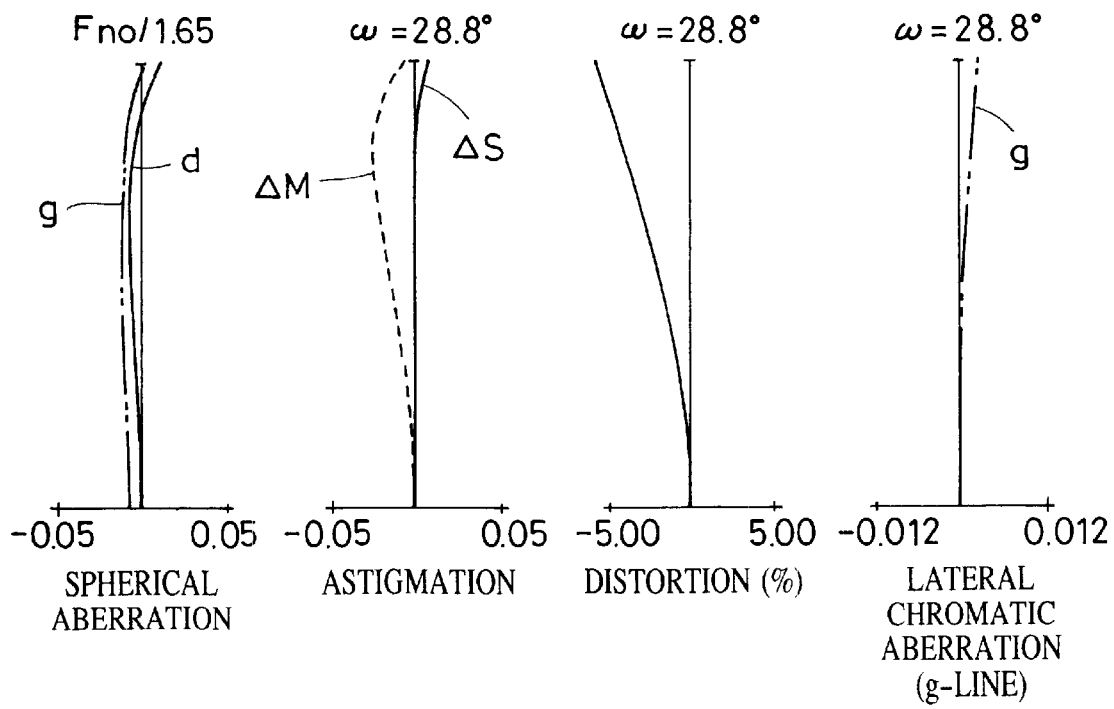
FIGS. 10A, 10B, 10C, and 10D represent aberrations at the wide-angle end in Numerical Value Example 3 of the present invention.

FIG. 1 is a sectional view of a lens represented by Numerical Value Example 1 of the present invention, and FIGS. 2A to 4D represent aberrations at the wide-angle end, the medium zoom position, and the telephoto end in Numerical Value Example 1 of the present invention, respectively. FIG. 5 is a sectional view of a lens represented by Numerical Value Example 2 of the present invention, and FIGS. 6A to 8D represent aberrations at the wide-angle end, the medium zoom position, and the telephoto end in Numerical Value Example 2 of the present invention, respectively. FIG. 9 is a sectional view of a lens represented by Numerical Value Example 3 of the present invention, and FIGS. 10A to 12D represent aberrations at the wide-angle end, the medium zoom position, and the telephoto end in Numerical Value Example 3 of the present invention, respectively.

In each sectional view of the lens, L1 denotes a first lens unit having positive refractive power, L2 denotes a second lens unit having negative refractive power, L3 denotes a third lens unit having positive refractive power, L4 denotes a fourth lens unit having positive refractive power, and L5 denotes a fifth lens unit having negative refractive power. SP denotes a stop (aperture stop) disposed between the second and third lens units. The stop SP is moved under predetermined conditions in zooming.

G denotes a filter such as an infrared cut filter or a low-pass filter, which is illustrated in the form of a glass block. IP denotes an image plane.

In the zoom lens of this embodiment, for zooming from the wide-angle end to the telephoto end, the first lens unit is moved toward the object side and the second lens unit is moved toward the image plane side as indicated by respective arrows. Also, the fourth lens unit is moved to follow a locus, which is convex toward the object side, to compensate for a shift of the image plane (field shift) upon the zooming.

Further, this embodiment employs rear focusing in which the fourth lens unit is moved along an optical axis for focusing. A solid-line curve 4a and a dotted-line curve 4b in FIGS. 1, 5 and 9 represent loci following which the fourth lens unit is moved to compensate for a shift of the image plane that occurs during zooming from the wide-angle end to the telephoto end when focusing is performed on an infinite object and a proximity object, respectively. The third and fifth lens units are kept fixed during the zooming and the focusing.

In this embodiment, for example, when focusing is performed from an infinite object to a proximity object at the telephoto end, the fourth lens unit is shifted forwards as indicated by a straight line 4c in FIGS. 1, 5 and 9.

Additionally, the stop SP is moved under predetermined conditions in the zooming from the wide-angle end to the telephoto end.

A lens arrangement of the zoom lens represented by each Numerical Value Example will be described below in more detail.

In Numerical Value Example 1 of FIG. 1, the zoom lens comprises five lens units, i.e., a first lens unit having positive refractive power, a second lens unit having negative refractive power, an aperture stop, a third lens unit having positive refractive power and kept always fixed, a fourth lens unit having positive refractive power, and a fifth lens unit having negative refractive power and kept always fixed, which are arranged in this order from the object side. For zooming from the wide-angle end to the telephoto end, the first lens unit is moved toward the object side, the second lens unit is moved toward the image plane side, and the aperture stop is also moved toward the image plane side as indicated by arrows. At the same time, the fourth lens unit is moved to compensate for shift of the image plane upon zooming. Further, this Example employs rear focusing in which the fourth lens unit is moved along an optical axis for focusing.

In Numerical Value Example 2 of FIG. 5, the zoom lens comprises five lens units, i.e., a first lens unit having positive refractive power, a second lens unit having negative refractive power, an aperture stop, a third lens unit having positive refractive power and kept always fixed, a fourth lens unit having positive refractive power, and a fifth lens unit having negative refractive power and kept always fixed, which are arranged in this order from the object side. For zooming from the wide-angle end to the telephoto end, the first lens unit is moved toward the object side and the second lens unit is moved toward the image plane side as indicated by arrows. At the same time, the fourth lens unit is moved to compensate for shift of the image plane upon zooming. In the zooming, the aperture stop is held in a substantially fixed state in a range from the wide-angle end to the medium focal length, and is moved toward the image plane side in a range from the medium focal length to the telephoto end. Further, this Example employs rear focusing in which the fourth lens unit is moved along an optical axis for focusing.

In Numerical Value Example 3 of FIG. 9, the zoom lens comprises five lens units, i.e., a first lens unit having positive refractive power, a second lens unit having negative refractive power, an aperture stop, a third lens unit having positive refractive power and kept always fixed, a fourth lens unit having positive refractive power, and a fifth lens unit having negative refractive power and kept always fixed, which are arranged in this order from the object side. For zooming from the wide-angle end to the telephoto end, the first lens unit is moved toward the object side and the second lens unit is moved toward the image plane side as indicated by arrows. At the same time, the fourth lens unit is moved to compensate for shift of the image plane upon zooming. In the zooming, the aperture stop is moved toward the object side in a range from the wide-angle end to the medium focal length, and is moved toward the image plane side in a range from the medium focal length to the telephoto end. Further, this Example employs rear focusing in which the fourth lens unit is moved along an optical axis for focusing.

In any of the Examples, the third lens unit, which is described above as not moving for zooming, may be moved substantially perpendicular relative to the direction of the optical axis to compensate for field movement of an object image.

Thus, in the zoom lens of this embodiment, the first, second, third and fourth lens units and the stop are moved in the zooming such that a plurality of lens units contributes to the zooming action in a well-balanced manner. As a result, the zooming is efficiently performed while realizing a size reduction of the overall lens system, and aberrations are satisfactorily compensated for in the overall zooming range.

Although the zoom lens intended by this embodiment is achieved with the arrangement described above, at least one of the following conditions (features) is preferably satisfied in order to obtain a small-sized zoom lens according to this embodiment, which has higher optical performance at any position from the wide-angle end to the telephoto end over an entire range of distance to an object.

(A-1) The first lens unit is moved toward the object side in the zooming from the wide-angle end to the telephoto end. With this feature, the first lens unit also takes part in magnifying an image to increase a zoom magnification ratio.

(A-2) The fourth lens unit is moved not only to compensate for shift of the image plane upon the zooming, but also to serve for the focusing. In other words, rear focusing is employed. As compared with a zoom lens in which the first lens unit is moved for focusing, this feature is more advantageous in reducing the effective diameter of the first lens unit and facilitating a size reduction of the overall lens system. Also, macro (close-up) shooting, particularly super-macro shooting, is facilitated. Further, since a relatively light lens unit is moved, a force required for driving the lens unit is relatively small and rapid focusing can be achieved.

(A-3) The fourth lens unit is moved to follow a locus convex toward the object side in the zooming. This feature provides a similar advantage as that obtained with (A-2).

(A-4) The aperture stop is moved toward the image plane side in the zooming from the wide-angle end to the telephoto end.

(A-5) In the zooming from the wide-angle end to the telephoto end, the aperture stop is moved toward the image plane side in the zooming range from the medium position to the telephoto end.

(A-6) In the zooming from the wide-angle end to the telephoto end, the aperture stop is moved to follow a locus that locates nearest to the object side at the medium position in the zooming range. In the zoom lens having the above-described lens arrangement, the first lens unit constitutes the largest part of the lens weight, i.e., about 90 percent of the total weight. Therefore, reducing the weight of the first lens unit greatly contributes to a reduction of the total lens weight.

In the zoom lens of this embodiment, the effective diameter of the first lens unit is determined by marginal light flux at the medium zoom position. Therefore, the size of the first lens unit can be reduced by directing that light flux toward the lens optical axis, i.e., by positioning the aperture stop as close as possible to the first lens unit. However, if the aperture stop is positioned too close to the first lens unit, the size of the lens system near the image plane would have to be increased, or the optical performance would deteriorate.

Thus, taking into account the above, the features (A-4), (A-5) and (A-6) are intended to obtain a sufficient amount of light at the margin of an image field while reducing the effective size of the first lens unit.

(A-7) Assuming that the distances between the second lens unit and the aperture stop at a zoom position at which the aperture stop is positioned farthest from the third lens unit along the optical axis and the telephoto end are respectively L2s, L2t, and the distances between the aperture stop and the third lens unit at the zoom position and the telephoto end are respectively Ls3, L3t, the following conditional formula is satisfied at any position of the aperture stop:

$$0.4 < (L2s - L2t)/(Ls3 - L3t) < 1.3 \quad (1)$$

If the aperture stop is positioned too close to the third lens unit side beyond an upper limit value of the conditional formula (1), the distance between the first lens unit and the aperture stop would be increased to such an extent that it would be difficult to reduce the effective diameter of the first lens unit. Conversely, if the aperture stop is positioned too close to the second lens unit side beyond a lower limit value of the conditional formula (1), the effective diameter of the lens unit near the image plane would be increased to such an extent that it would be difficult to maintain good optical performance.

(A-8) Assuming that the focal lengths of the overall lens system at the wide-angle end and the telephoto end are respectively fw, ft, the focal length of the second lens unit is f2, and fA is defined as given below;

$$fA = \sqrt{fw \cdot ft}$$

the following conditional formula is satisfied:

$$0.19 < |f2/fA| < 0.30 \quad (2)$$

This feature represents a condition for properly setting the focal length of the second lens unit. If the focal length of the second lens unit is too long beyond an upper limit value of the conditional formula (2), this would be advantageous from the viewpoint of compensating for aberrations, but would raise a disadvantage of increasing the amount by which the second lens unit must be moved to obtain a desired zoom magnification ratio, thus resulting in an increased size of the overall lens system. Conversely, if the focal length of the second lens unit is too short beyond a lower limit value of the conditional formula (2), the Petzval's sum would be increased in the negative direction and the image plane would be tilted, thus resulting in a difficulty in maintaining good optical performance.

(A-9) Assuming that the distance from a first lens surface on the object side to a paraxial image plane is L on condition that the distance from a final lens surface to the image plane is calculated in terms of air, the focal lengths of the overall lens system at the wide-angle end and the telephoto end are respectively fw, ft, and fA is defined as given below;

$$fA = \sqrt{fw \cdot ft}$$

the following conditional formula is satisfied in a state of focusing on an infinite object at the wide-angle end:

$$2.22 < L/fA < 3.36 \quad (3)$$

If a value of L/fA exceeds above an upper limit value of the conditional formula (3), the length of the overall lens system would be too long. Conversely, if a value of L/fA exceeds below a lower limit value of the conditional formula (3), the Petzval's sum would be increased in the negative direction and the image plane would be tilted, thus resulting in a difficulty in maintaining good optical performance.

(A-10) Assuming the amounts by which the first lens unit and the second lens unit are moved in the zooming from the wide-angle end to the telephoto end are respectively S1, S2, the following conditional formula is satisfied:

$$0.6 < S1/S2 < 1.2 \quad (4)$$

This conditional formula (4) is related to a ratio between the amounts by which the first lens unit and the second lens unit are moved in the zooming from the wide-angle end to the telephoto end, and represents a condition for reducing the effective diameter of the first lens unit and shortening the overall lens system in a well-balanced manner, while satisfactorily compensating for variations of aberrations occurred primarily upon the zooming. If the amount of movement of the first lens unit is increased beyond an upper limit value of the conditional formula (4), the distance from the aperture stop to the first lens unit would be too large in the range from the medium focal length to the telephoto end, whereby abaxial light flux would enter the first lens unit at a position farther away from the lens optical axis and the effective diameter of the first lens unit would be increased. Conversely, if the amount of movement of the first lens unit is decreased beyond a lower limit value of the conditional formula (4), it would be difficult to shorten the overall lens system at the wide-angle end or to obtain a desired zoom magnification ratio.

(A-11) The fifth lens unit is kept always fixed during the zooming.

(A-12) The third lens unit is moved substantially perpendicular relative to the direction of the optical axis to compensate for field movement of an object image occurring in the zooming operation of the zoom lens.

(A-13) The second lens unit preferably comprises a negative 21st lens having a powerful concave surface faced toward the image plane side, a negative 22nd lens having both concave lens surfaces, and a positive 23rd cemented lens, which are arranged in this order from the object side. The cemented lens is made of a positive lens, which has a more powerful convex surface faced toward the object side than that faced toward the image plane side, and a negative lens cemented to each other.

Increasing a zoom magnification ratio in the zoom lens of this embodiment requires increasing the amount of movement of the second lens unit, which greatly contributes to the zooming action, or shortening the focal length of the second lens unit.

However, the former method is not advantageous in increasing the size of the zoom lens. The latter method does not increase the lens size, but imposes an excessive burden on the second lens unit, thus resulting in a difficulty in maintaining good optical performance. By arranging the second lens unit as described above, the optical performance can be satisfactorily maintained.

(A-14) The second lens unit has at least one aspherical surface. Abaxial optical performance can be improved by forming the second lens unit to have an aspherical surface. The presence of an aspherical surface intensifies the refractive power of the second lens unit, reduces the amount by which the second lens unit must be moved, and hence shortens the overall lens system. Further, aberrations can be more efficiently compensated for by arranging the aspherical surface in the second lens unit as a surface of the negative 21st lens positioned to face the image plane side and having a smaller radius of curvature, or as a surface of the negative 22nd lens positioned to face the object side, or as a surface of the positive 23rd lens positioned to face the object side. This arrangement is particularly effective in compensating for abaxial flares in a satisfactory manner. Preferably, the aspherical surface is shaped such that the refractive power is gradually weakened toward the margin from the center of the lens.

(A-15) Assuming that the average Abbe's number (constant) of material of a positive lens in the second lens unit is vp and the average Abbe's number of material of a negative lens in the second lens unit is vn, at least one of the following conditional formulae is preferably satisfied:

$$20 < vp < 35 \quad (5)$$

$$36 < vn < 65 \quad (6)$$

This feature serves to sufficiently compensate for a chromatic aberration occurring in the second lens unit. Since the second lens unit greatly contributes to the zooming action, aberrations occurring in the second lens unit must be compensated for to an allowable level. Particularly, in a zoom lens having a zoom magnification ratio as high as on the order of 10, it is important to sufficiently compensate for chromatic aberration as well.

If a value of the Abbe's number exceeds above an upper limit value of the conditional formula (5), the axial chromatic aberration would be an over-aberration, thus resulting in excessive compensation. Conversely, if a value of the Abbe's number exceeds below a lower limit value of the conditional formula (5), the axial chromatic aberration would be an under-aberration, thus resulting in insufficient compensation. Although a phenomenon occurs in a reversed manner between the conditional formula (5) and the conditional formula (6), it would be similarly difficult to compensate for chromatic aberration if a value of the Abbe's number exceeds above or below an upper or lower limit value of the conditional formula (6).

(A-16) Assuming that the average refractive index of material of a negative lens in the second lens unit is Nn, the following conditional formula is satisfied:

$$1.80 < Nn < 1.96 \quad (7)$$

In cooperation with the above conditional formula (2), this feature represents a condition for avoiding a deterioration of the Petzvar's sum by employing glass having a high refractive index to form the negative lens. If a value of Nn exceeds above or below an upper or lower limit value of the conditional formula (7), a curvature of the image plane (field curvature) would deteriorate.

(A-17) Assuming that the radius of curvature of an i-th lens surface in the second lens unit counted in order from the object side is R2i, the following conditional formula is satisfied:

$$0.60 < |R22/R23| < 0.82 \quad (8)$$

This feature represents a condition for compensating for a coma aberration, a curvature of the image plane, and flares in a well-balanced manner. If an absolute value of R22/R23 exceeds above an upper limit value of the conditional formula (8), the coma aberration would be too increased. Conversely, if an absolute value of R22/R23 exceeds below a lower limit value of the conditional formula (8), the image plane would be curved to be concave toward the object side. Further, if an absolute value of R22/R23 exceeds above or below the upper or lower limit value, flares would be too increased.

A second embodiment of the present invention will be described below.

FIGS. 13, 17 and 21 are explanatory views of a zoom lens according to this second embodiment.

More specifically, FIG. 13 is a sectional view of principal parts of a lens represented by Numerical Value Example 4 of the present invention, and FIGS. 14A to 16D represent aberrations at the wide-angle end, the medium zoom position, and the telephoto end in Numerical Value Example 4, respectively. FIG. 17 is a sectional view of principal parts of a lens represented by Numerical Value Example 5 of the present invention, and FIGS. 18A to 20D represent aberrations at the wide-angle end, the medium zoom position, and the telephoto end in Numerical Value Example 5, respectively. FIG. 21 is a sectional view of principal parts of a lens represented by Numerical Value Example 6 of the present invention, and FIGS. 22A to 24D represent aberrations at the wide-angle end, the medium zoom position, and the telephoto end in Numerical Value Example 6, respectively.

In the sectional view of the lens shown in each of FIGS. 13, 17 and 21, L11 denotes a first lens unit having positive refractive power, L12 denotes a second lens unit having negative refractive power, L13 denotes a third lens unit having positive refractive power, and L14 denotes a fourth lens unit having positive refractive power. SP1 denotes a aperture stop disposed forward of the third lens unit L13.

G1 denotes a glass block such as a color separating prism, a face plate or a filter. IP1 denotes an image plane in which an image pickup device, such as a CCD, is disposed.

In the zoom lens of this embodiment, for zooming from the wide-angle end to the telephoto end, the first lens unit is moved toward the object side and the second lens unit is moved toward the image plane side, as indicated by respective arrows, so that the spacing between the first and second lens units is gradually increased. Also, the fourth lens unit is moved to follow a locus, which is convex toward the object side, to compensate for a shift of the image plane upon the zooming.

Further, in the zooming, the aperture stop SP1 is moved toward the object side in a range from the wide-angle end to the medium focal length, and is moved toward the image plane side in a range from the medium focal length to the telephoto end.

The third lens unit is kept fixed during the zooming.

The fourth lens unit comprises one or more negative lenses.

Also, this embodiment employs rear focusing in which the fourth lens unit is moved along an optical axis for focusing. A solid-line curve 4a and a dotted-line curve 4b in FIGS. 13, 17 and 21 represent loci following which the fourth lens unit is moved to compensate for a shift of the image plane occurring in the zooming from the wide-angle end to the telephoto end when focusing is performed on an infinite object and a proximity object, respectively.

Particularly, as indicated by the curves 4a, 4b in FIGS. 13, 17 and 21, the fourth lens unit is moved to follow the loci, which are convex toward the object side, in the zooming from the wide-angle end to the telephoto end. As a result, it is possible to effectively utilize a space between the third and fourth lens units, and to effectively reduce the length of the overall lens system.

In this embodiment, for example, when focusing is performed from an infinite object to a proximity object at the telephoto end, the fourth lens unit is shifted forwards as indicated by a straight line 4c in FIGS. 13, 17 and 21. Additionally, the rear focusing zoom lens of this embodiment includes the stop that is positioned adjacent to the third lens unit on the object side and is moved in the zooming.

In any of Examples, the third lens unit, which is described above as being always kept fixed during the zooming, may be moved substantially vertically relative to the direction of the optical axis. This is effective to compensate for field movement of an object image (i.e., image shift).

By thus arranging the optical system as described above, this embodiment can provide a zoom lens having superior characteristics; i.e., the size of the overall lens system is reduced, rapid focusing is realized, high optical performance is ensured in spite of a zoom magnification ratio being as high as on the order of 10, and the lens system comprises fewer lenses while having a large aperture ratio, with the F-number being about 1.6.

Although the zoom lens intended by this embodiment is achieved with the arrangement described above, at least one of the following conditions (features) is preferably satisfied from the viewpoints of reducing the size of the overall lens system, compensating for aberrations, and applying the zoom lens to optical equipment.

(B-1) Generally, when mounting a zoom lens on a camera that employs an electronic image pickup device such as a CCD, it is important to make a proper matching between an exit angle of light from the zoom lens and an arrangement of a lens array of the electronic image pickup device.

Assuming that the shortest exit pupil position (distance from the image plane to the exit pupil calculated in terms of air) of the overall lens system in the zooming from the wide-angle end to the telephoto end and in the focusing from an infinite object to a proximity object is EP, the focal length of the overall lens system at the wide-angle is fw, and the half angle of view is ωw (that is expressed by $$\omega w = \tan^{-1} \frac{LD}{2fw}$$

where LD is the effective size of the electronic image pickup device), the following conditional formula is preferably satisfied;

$$0 < |(fw \cdot \tan \omega w)/EP| < 0.13 \tag{9}$$

for obtaining a more appropriate matching between the zoom lens of this embodiment and the electronic image pickup device.

Satisfying the conditional formula (9) is effective to ensure a better matching between the zoom lens and the electronic image pickup device, e.g., a CCD, while achieving a size reduction of the overall lens system, and to obtain a good camera image with more ease.

If a value of the parameter exceeds above an upper limit value of the conditional formula (9), i.e., if the shortest exit pupil distance EP is too short, the amount of light flux focusing on a higher position of the image and entering a corresponding light receiving surface of the CCD would be reduced, thus resulting in a phenomenon that the marginal area of an image field is darkened. Conversely, if a value of the parameter exceeds below a lower limit value of the conditional formula (9), i.e., if the shortest exit pupil distance EP is too long, there would likewise occur a phenomenon that the marginal area of an image field is darkened.

More preferably, the range of numerical value expressed by the conditional formula (9) is narrowed to satisfy:

$$0.05 < |(fw \cdot \tan \omega w)/EP| < 0.12 \tag{9a}$$

The first lens unit is moved toward the object side in the zooming from the wide-angle end to the telephoto end for realizing a further size reduction.

With that feature, the first lens unit also takes part in magnifying an image to increase a zoom magnification ratio with ease.

(B-3) The fourth lens unit is moved not only to compensate for shift of the image plane upon the zooming, but also to serve for the focusing. In other words, rear focusing is preferably employed from the standpoint of reducing the size of the overall lens system.

As compared with a zoom lens in which the first lens unit is moved for focusing, that feature is more advantageous in reducing the effective diameter of the first lens unit and facilitating a size reduction of the overall lens system. Also, macro (close-up) shooting, particularly super-macro shooting, is facilitated. Further, since a relatively light lens unit is moved, a force required for driving the lens unit is relatively small and rapid focusing can be achieved.

(B-4) In the zooming from the wide-angle end to the telephoto end, the aperture stop is preferably moved to follow a locus that is located nearest to the object side at the medium position in the zooming range for reducing the size of the overall lens system.

(B-5) In the zoom lens having the above-described lens arrangement, the first lens unit occupies the largest part of the lens weight, i.e., about 90 percent of the total weight. Therefore, reducing the weight of the first lens unit greatly contributes to a reduction in both weight and size of the overall lens system.

Also, in the zoom lens, the effective diameter of the first lens unit is determined by marginal light flux at the medium zoom position. Therefore, the size of the first lens unit can be easily reduced by directing that light flux toward the lens optical axis.

Stated otherwise, the size of the first lens unit can be reduced by positioning the aperture stop as close as possible to the first lens unit.

However, if the aperture stop is positioned too close to the first lens unit, the lens diameter of the fourth lens unit near the image plane would have to be increased or the optical performance would deteriorate. For that reason, the aperture is preferably moved so as to locate nearest to the object side at the medium zoom position.

(B-6) Assuming that the focal lengths of the overall lens system at the wide-angle end and the telephoto end are respectively fw, ft, the focal length of the second lens unit is f2, and fA is defined as given below;

$$fA = \sqrt{fw \cdot ft}$$

the following conditional formula is preferably satisfied;

$$0.1 < |f2/fA| < 0.29 \tag{10}$$

for reducing the size of the overall lens system and obtaining good optical performance.

This feature represents a condition for properly setting the focal length of the second lens unit.

If the focal length of the second lens unit is too long beyond an upper limit value of the conditional formula (10), this would be advantageous from the viewpoint of compensating for aberrations, but would raise a disadvantage of increasing the amount by which the second lens unit must be moved to obtain a desired zoom magnification ratio, thus resulting in an increased size of the overall lens system. Conversely, if the focal length of the second lens unit is too short beyond a lower limit value of the conditional formula (10), the Petzval's sum would be increased in the negative direction and the image plane would be tilted, thus resulting in a difficulty in maintaining good optical performance.

More preferably, the range of numerical value expressed by the conditional formula (10) is narrowed to satisfy:

$$0.2 < |f2/fA| < 0.27 \tag{10a}$$

(B-7) Assuming that the spacing between the principal points of the third lens unit and the fourth lens unit resulted in focusing on an infinite object at the telephoto end is e3T and the focal length of the overall lens system at the wide-angle end is fw, the following conditional formula is preferably satisfied;

$$1.79 < e3T/fw < 2.76 \tag{11}$$

for reducing the size of the overall lens system.

This conditional formula (11) represents a condition related to the spacing between the paraxial principal points of the third lens unit and the fourth lens unit at the telephoto end. If the spacing is increased beyond an upper limit value of the conditional formula (11), a useless space would be enlarged and the length of the overall lens system would be increased. Conversely, if the spacing is decreased beyond a lower limit value of the conditional formula (11), it would be difficult to ensure a space necessary for shifting the fourth lens unit for focusing on a proximity object.

More preferably, the range of numerical value expressed by the conditional formula (11) is narrowed to satisfy:

$$2.0 < e3T/fw < 2.6 \tag{11a}$$

(B-8) Assuming that the focal lengths of the third lens unit and the fourth lens unit are respectively f3, f4, the following conditional formula is preferably satisfied;

$$0.63 < f3/f4 < 1.02 \tag{12}$$

for reducing the size of the overall lens system and obtaining good optical performance.

This conditional formula (12) is related to a ratio between the focal lengths of the third lens unit and the fourth lens unit, and represents a condition for primarily realizing a desired back focus (focal length) while achieving the size reduction. If the focal length of the third lens unit is increased beyond an upper limit value of the conditional formula (12), the back focus would be too long, and if the focal length of the fourth lens unit is decreased beyond the upper limit value, variations of aberrations due to the fourth lens unit would be too large. Conversely, if the focal length of the third lens unit is decreased beyond a lower limit value of the conditional formula (12), the back focus would be too short, and if the focal length of the fourth lens unit is increased beyond the lower limit value, the amount by which the fourth lens unit is moved in the focusing would be enlarged and the length of the overall lens system would be increased.

More preferably, the range of numerical value expressed by the conditional formula (12) is narrowed to satisfy:

$$0.7 < f3/f4 < 0.95 \tag{12a}$$

Although the size of the overall lens system can be reduced by satisfying at least one of the conditional formulae (10) to (12), the size reduction can be more easily achieved by satisfying two or more of those conditional formulae.

(B-10) For shortening the overall lens system, it is important to eliminate a useless space as far as possible.

By moving the fourth lens unit to follow the loci, which are convexed toward the object side, in the zooming and the focusing, a space between the third and fourth lens units can be effectively utilized and the overall lens system can be further shortened with ease.

(B-11) Assuming that the distances between the second lens unit and the aperture stop at a zoom position at which the aperture stop is positioned farthest from the third lens unit along the optical axis and the telephoto end are respectively L2s, L2t, and the distances between the aperture stop and the third lens unit at the zoom position and the telephoto end are respectively Ls3, L3t, the aperture stop is preferably moved to satisfy the following conditional formula for reducing the size of the overall lens system:

$$0.2<(L2s-L2t)/(Ls3-L3t)<0.9 \quad (13)$$

If the aperture stop is positioned too close to the third lens unit side beyond an upper limit value of the conditional formula (13), the distance between the first lens unit and the aperture stop would be increased to such an extent that it would be difficult to reduce the effective diameter of the first lens unit. Conversely, if the aperture stop is positioned too close to the second lens unit side beyond a lower limit value of the conditional formula (13), the effective diameter of the lens unit near the image plane would be increased to such an extent that it would be difficult to maintain good optical performance.

More preferably, the range of numerical value expressed by the conditional formula (13) is narrowed to satisfy:

$$0.25<(L2s-L2t)/(Ls3-L3t)<0.8 \quad (13a)$$

(B-12) Assuming the amounts by which the first lens unit and the second lens unit are moved in the zooming (i.e., the maximum amounts of movements of those lens units in the direction of the optical axis in the entire zooming range) are respectively M1, M2, the following conditional formula is preferably satisfied;

$$0.5<M1/M2<1.2 \quad (14)$$

for obtaining high optical performance while ensuring a predetermined zoom magnification ratio.

This conditional formula (14) is related to a ratio between the amounts by which the first lens unit and the second lens unit are moved in the zooming from the wide-angle end to the telephoto end, and represents a condition for reducing the effective diameter of the first lens unit and shortening the overall lens system in a well-balanced manner, while satisfactorily compensating for variations of aberrations occurring primarily upon the zooming. If the amount of movement of the first lens unit is increased beyond an upper limit value of the conditional formula (14), the distance from the aperture stop to the first lens unit would be too large in the range from the medium focal length to the telephoto end, whereby abaxial light flux would enter the first lens unit at a position farther away from the lens optical axis and the effective diameter of the first lens unit would be increased. Conversely, if the amount of movement of the first lens unit is decreased beyond a lower limit value of the conditional formula (14), it would be difficult to shorten the overall lens system at the wide-angle end or to obtain a desired zoom magnification ratio.

More preferably, the range of numerical value expressed by the conditional formula (14) is narrowed to satisfy:

$$0.55<M1/M2<1.0 \quad (14a)$$

(B-13) The second lens unit preferably comprises a negative 21st lens having a powerful concave surface faced toward the image plane side, and a cemented lens made up of a negative 22nd lens having both concave lens surfaces and a positive 23rd lens having a powerful convex surface faced toward the object side, which are arranged in this order from the object side.

Increasing a zoom magnification ratio in the zoom lens of this embodiment requires increasing the amount of movement of the second lens unit, which greatly contributes to the zooming action, or shortening the focal length (intensify refractive power) of the second lens unit.

However, the former method is not advantageous in increasing the size of the zoom lens. The latter method does not increase the overall lens size, but imposes an excessive burden on the second lens unit, thus resulting in a difficulty in maintaining good optical performance. By arranging the second lens unit as described above, the optical performance can be satisfactorily maintained.

(B-14) One or more aspherical surfaces are preferably included in the second lens unit. This arrangement is effective to improve abaxial optical performance with ease.

Since the presence of an aspherical surface enables aberrations to be easily compensated for in the second lens unit, such an arrangement makes it possible to intensify the refractive power of the second lens unit, reduce the amount by which the second lens unit must be moved, and hence to shorten the overall lens system.

Furthermore, aberrations can be more efficiently compensated for by arranging the aspherical surface in the second lens unit as a surface of the negative 21st lens positioned to face the image plane side and having a smaller radius of curvature, or as a surface of the negative 22nd lens positioned to face the object side, or as a surface of the positive 23rd lens positioned to face the object side. This arrangement is particularly effective in compensating for abaxial flares in a satisfactory manner.

Preferably, the aspherical surface is shaped such that the refractive power is gradually weakened toward the margin from the center of the lens.

(B-15) Assuming that the radius of curvature of an i-th lens surface in the second lens unit counted in order from the object side is R2i, the following conditional formula is preferably satisfied;

$$0.52<|R22/R23|<0.92 \quad (15)$$

for satisfactorily compensating for aberrations. Note that the radius of curvature of each lens surface is a radius of paraxial curvature when the lens surface is an aspherical one.

This conditional formula (15) represents a condition for primarily compensating for a coma aberration, a curvature of the image plane (field curvature), and flares in a well-balanced manner.

If an absolute value of R22/R23 exceeds above an upper limit value of the conditional formula (15), the coma aberration would be too much increased. Conversely, if an absolute value of R22/R23 exceeds below a lower limit value of the conditional formula (15), the image plane would be curved to be concave toward the object side.

More preferably, the range of numerical value expressed by the conditional formula (15) is narrowed to satisfy:

$$0.60<|R22/R23|<0.85 \quad (15a)$$

Numerical Value Examples of the present invention will be described below in detail.

In each of Numerical Value Examples, Ri represents the radius of curvature of an i-th lens surface counted in order from the object side, and Di represents an i-th lens thickness or air spacing counted in order from the object side. Ni, νi represent respectively the refractive index and the Abbe's number of material of an i-th optical member counted in order from the object side.

Assuming the direction of the optical axis is an X-axis, the direction vertical to the optical axis is an H-axis, the direction of travel of light is positive, the radius of paraxial curvature is R, and respective aspherical surface coefficients are K, B, C, D, E and F, a shape of the spherical surface is expressed by:

$$X = \frac{(1/R)H^2}{1 + \sqrt{1 - (1+K)(H/R)^2}} + BH^4 + CH^6 + DH^8 + EH^{10} + FH^{12}$$

Also, an expression "e-Z" means "$10^{-z}$". Relationships between the above-described conditional formulae and numerical values in Numerical Value Examples are listed in the following Table-1 and Table-2.

NUMERICAL VALUE EXAMPLE 1

| f = 1 to 9.66 | Fno = 1.65 to 3.25 | 2ω = 57.5 to 6.5 | |
|---|---|---|---|
| R1 = 11.656 | D1 = 0.17 | N1 = 1.846660 | ν1 = 23.8 |
| R2 = 3.415 | D2 = 0.83 | N2 = 1.772499 | ν2 = 49.6 |
| R3 = −28.421 | D3 = 0.04 | | |
| R4 = 3.038 | D4 = 0.44 | N3 = 1.804000 | ν3 = 46.6 |
| R5 = 6.343 | D5 = variable | | |
| R6 = 2.172 | D6 = 0.12 | N4 = 1.882997 | ν4 = 40.8 |
| R7 = 0.736 | D7 = 0.31 | | |
| R8 = −1.116 | D8 = 0.12 | N5 = 1.882997 | ν5 = 40.8 |
| R9 = 2.540 | D9 = 0.02 | | |
| R10* = 1.764 | D10 = 0.35 | N6 = 1.846660 | ν6 = 23.8 |
| R11 = −1.655 | D11 = 0.12 | N7 = 1.834807 | ν7 = 42.7 |
| R12 = −8.048 | D12 = variable | | |
| R13 = stop | D13 = variable | | |
| R14* = 1.558 | D14 = 0.65 | N8 = 1.583130 | ν8 = 59.4 |
| R15* = −35.214 | D15 = variable | | |
| R16 = 1.809 | D16 = 0.12 | N9 = 1.922860 | ν9 = 18.9 |
| R17 = 1.073 | D17 = 0.77 | N10 = 1.677900 | ν10 = 55.3 |
| R18* = −2.930 | D18 = variable | | |
| R19 = −11.272 | D19 = 0.12 | N11 = 1.834807 | ν11 = 42.7 |
| R20 = 3.507 | D20 = 0.18 | | |
| R21 = ∞ | D21 = 0.90 | N12 = 1.516330 | ν12 = 64.2 |
| R22 = ∞ | | | |

| | Focal Length | | |
|---|---|---|---|
| Variable Spacing | 1.00 | 5.62 | 9.66 |
| D5 | 0.12 | 2.43 | 2.82 |
| D12 | 0.79 | 0.16 | 0.10 |
| D13 | 0.96 | 0.35 | 0.17 |
| D15 | 0.84 | 0.59 | 0.99 |
| D18 | 0.34 | 0.60 | 0.20 |

*aspherical surface

Aspherical Surface Coefficients

| | | | |
|---|---|---|---|
| R10 | K = −2.53361e+00 | B = 8.27549e−04 | C = −4.35550e−02 |
| | D = 1.25833e+00 | E = −6.76378e+00 | F = 4.04097e+00 |
| R14 | K = −5.06820e−01 | B = −2.48837e−02 | C = 2.11642e−02 |
| | D = −8.84008e−03 | | |
| R15 | K = −2.31311e+03 | B = 2.51760e−03 | C = 3.37468e−02 |
| | D = −2.18694e−02 | E = −3.00891e−03 | |
| R18 | K = −3.33565e+01 | B = −7.38446e−02 | C = 2.23090e−01 |
| | D = −2.34178e−01 | E = 9.84420e−02 | F = 1.72948e−02 |

NUMERICAL VALUE EXAMPLE 2

| f = 1 to 9.66 | Fno = 1.65 to 3.19 | 2ω = 57.5 to 6.5 | |
|---|---|---|---|
| R1 = 11.036 | D1 = 0.17 | N1 = 1.846660 | ν1 = 23.8 |
| R2 = 3.331 | D2 = 0.82 | N2 = 1.772499 | ν2 = 49.6 |
| R3 = −31.931 | D3 = 0.04 | | |
| R4 = 2.974 | D4 = 0.44 | N3 = 1.804000 | ν3 = 46.6 |
| R5 = 6.271 | D5 = variable | | |
| R6 = 2.306 | D6 = 0.12 | N4 = 1.882997 | ν4 = 40.8 |
| R7 = 0.738 | D7 = 0.33 | | |
| R8 = −1.105 | D8 = 0.12 | N5 = 1.882997 | ν5 = 40.8 |
| R9 = 2.522 | D9 = 0.02 | | |
| R10* = 1.809 | D10 = 0.35 | N6 = 1.846660 | ν6 = 23.8 |
| R11 = −1.625 | D11 = 0.12 | N7 = 1.834807 | ν7 = 42.7 |
| R12 = −6.628 | D12 = variable | | |
| R13 = stop | D13 = variable | | |
| R14* = 1.540 | D14 = 0.65 | N8 = 1.583130 | ν8 = 59.4 |
| R15* = −34.653 | D15 = variable | | |
| R16 = 1.819 | D16 = 0.12 | N9 = 1.922860 | ν9 = 18.9 |
| R17 = 1.073 | D17 = 0.77 | N10 = 1.677900 | ν10 = 55.3 |
| R18* = −2.945 | D18 = variable | | |
| R19 = −9.817 | D19 = 0.12 | N11 = 1.834807 | ν11 = 42.7 |
| R20 = 3.595 | D20 = 0.18 | | |
| R21 = ∞ | D21 = 0.90 | N12 = 1.516330 | ν12 = 64.2 |
| R22 = ∞ | | | |

| | Focal Length | | |
|---|---|---|---|
| Variable Spacing | 1.00 | 1.29 | 9.66 |
| D5 | 0.12 | 0.62 | 2.74 |
| D12 | 1.00 | 0.73 | 0.10 |
| D13 | 0.73 | 0.76 | 0.15 |
| D15 | 0.78 | 0.70 | 0.92 |
| D18 | 0.34 | 0.42 | 0.20 |

*aspherical surface

Aspherical Surface Coefficients

| | | | |
|---|---|---|---|
| R10 | K = −2.91648e+00 | B = 9.10989e−03 | C = −2.70626e−02 |
| | D = 1.10055e+00 | E = −7.88245e+00 | F = 1.46459e+01 |
| R14 | K = −5.26692e−01 | B = −2.46206e−02 | C = 2.15409e−02 |
| | D = −7.61379e−03 | | |
| R15 | K = −2.68427e+03 | B = 1.54406e−03 | C = 3.39283e−02 |
| | D = −2.06359e−02 | E = 3.09788e−03 | |
| R18 | K = −3.22054e+01 | B = −6.72196e−02 | C = 2.19698e−01 |
| | D = −2.31523e−01 | E = 9.58875e−02 | F = 2.65508e−02 |

NUMERICAL VALUE EXAMPLE 3

| f = 1 to 9.66 | Fno = 1.65 to 3.12 | 2ω = 57.5 to 6.5 | |
|---|---|---|---|
| R1 = 12.691 | D1 = 0.17 | N1 = 1.846660 | ν1 = 23.8 |
| R2 = 3.562 | D2 = 0.83 | N2 = 1.772499 | ν2 = 49.6 |

-continued

| f = 1 to 9.66 | Fno = 1.65 to 3.12 | 2ω = 57.5 to 6.5 | |
|---|---|---|---|
| R3 = −21.876 | D3 = 0.04 | | |
| R4 = 3.046 | D4 = 0.41 | N3 = 1.804000 | ν3 = 46.6 |
| R5 = 5.919 | D5 = variable | | |
| R6 = 2.599 | D6 = 0.12 | N4 = 1.882997 | ν4 = 40.8 |
| R7 = 0.782 | D7 = 0.34 | | |
| R8 = −1.158 | D8 = 0.12 | N5 = 1.882997 | ν5 = 40.8 |
| R9 = 2.450 | D9 = 0.02 | | |
| R10* = 1.830 | D10 = 0.35 | N6 = 1.846660 | ν6 = 23.8 |
| R11 = −1.706 | D11 = 0.12 | N7 = 1.834807 | ν7 = 42.7 |
| R12 = −6.229 | D12 = variable | | |
| R13 = stop | D13 = variable | | |
| R14* = 1.520 | D14 = 0.65 | N8 = 1.583130 | ν8 = 59.4 |
| R15* = −28.125 | D15 = variable | | |
| R16 = 1.768 | D16 = 0.12 | N9 = 1.922860 | ν9 = 18.9 |
| R17 = 1.073 | D17 = 0.77 | N10 = 1.622977 | ν10 = 58.2 |
| R18* = −2.936 | D18 = variable | | |
| R19 = −6.186 | D19 = 0.12 | N11 = 1.882997 | ν11 = 40.8 |
| R20 = 8.143 | D20 = 0.18 | | |
| R21 = ∞ | D21 = 0.90 | N12 = 1.516330 | ν12 = 64.2 |
| R22 = ∞ | | | |

| | Focal Length | | |
|---|---|---|---|
| Variable Spacing | 1.00 | 1.76 | 9.66 |
| D5 | 0.13 | 1.17 | 2.93 |
| D12 | 1.24 | 0.47 | 0.10 |
| D13 | 0.53 | 0.79 | 0.16 |
| D15 | 0.81 | 0.61 | 0.95 |
| D18 | 0.34 | 0.54 | 0.20 |

*aspherical surface

Aspherical Surface Coefficients

| R10 | K = −1.18947e+00 | B = −1.27818e−02 | C = −1.17842e−01 |
| | D = 1.01956e+00 | E = −4.29624e+00 | F = 6.68912e+00 |
| R14 | K = −4.99445e−01 | B = −2.63210e−02 | C = 2.24463e−02 |
| | D = −8.13702e−03 | | |
| R15 | K = −2.03761e+03 | B = −9.32678e−04 | C = 3.40787e−02 |
| | D = −1.94903e−02 | E = 2.95735e−03 | |
| R18 | K = −3.13859e+01 | B = −6.96114e−02 | C = 2.26976e−01 |
| | D = −2.41488e−01 | E = 9.86735e−02 | F = 4.34007e−02 |

TABLE 1

| | Numerical Value Example | | |
|---|---|---|---|
| Conditional Formula | 1 | 2 | 3 |
| (1) | 0.86 | 1.02 | 0.58 |
| (2) | 0.24 | 0.24 | 0.25 |
| (3) | 2.79 | 2.77 | 2.80 |
| (4) | 0.83 | 0.77 | 0.85 |
| (5) | 23.8 | 23.8 | 23.8 |
| (6) | 41.4 | 41.4 | 41.4 |
| (7) | 1.87 | 1.87 | 1.87 |
| (8) | 0.66 | 0.67 | 0.68 |

NUMERICAL VALUE EXAMPLE 4

| f = 1 to 9.68 | Fno = 1.66 to 2.92 | 2ω = 56.5 to 6.3 | |
|---|---|---|---|
| R1 = 8.008 | D1 = 0.19 | N1 = 1.846660 | ν1 = 23.9 |
| R2 = 3.796 | D2 = 0.86 | N2 = 1.696797 | ν2 = 55.5 |
| R3 = −27.090 | D3 = 0.04 | | |
| R4 = 3.283 | D4 = 0.56 | N3 = 1.696797 | ν3 = 55.5 |
| R5 = 7.138 | D5 = variable | | |
| R6 = 5.166 | D6 = 0.12 | N4 = 1.882997 | ν4 = 40.8 |
| R7 = 0.897 | D7 = 0.45 | | |
| R8* = −1.169 | D8 = 0.27 | N5 = 1.665320 | ν5 = 55.4 |
| R9 = 1.387 | D9 = 0.33 | N6 = 1.846660 | ν6 = 23.9 |
| R10* = −179.400 | D10 = variable | | |
| R11 = stop | D11 = variable | | |
| R12* = 1.288 | D12 = 0.83 | N7 = 1.583126 | ν7 = 59.4 |
| R13* = −4.006 | D13 = 0.04 | | |
| R14 = 1.914 | D14 = 0.13 | N8 = 1.922860 | ν8 = 18.9 |
| R15 = 1.255 | D15 = variable | | |
| R16* = 2.524 | D16 = 0.55 | N9 = 1.583126 | ν9 = 59.4 |
| R17 = −2.035 | D17 = 0.12 | N10 = 1.922860 | ν10 = 18.9 |
| R18 = −3.009 | D18 = variable | | |
| R19 = ∞ | D19 = 0.38 | N11 = 1.516800 | ν11 = 64.2 |
| R20 = ∞ | D20 = 0.15 | N12 = 1.552320 | ν12 = 63.4 |
| R21 = ∞ | D21 = 0.18 | N13 = 1.556710 | ν13 = 58.6 |
| R22 = ∞ | | | |

| Focal Length | 1.00 | 2.06 | 9.68 |
|---|---|---|---|
| Variable Spacing | | | |
| D5 | 0.12 | 1.39 | 2.86 |
| D10 | 1.44 | 0.35 | 0.15 |
| D11 | 0.28 | 0.81 | 0.17 |
| D15 | 1.03 | 0.64 | 1.29 |
| D18 | 1.38 | 1.77 | 1.12 |

*aspherical surface

Aspherical Surface Coefficients

| R8 | K = 2.83999e+00 | B = 2.55367e−01 | C = 2.19716e−01 |
| | D = 6.63025e−01 | E = 4.70262e+00 | F = 2.94700e−01 |
| R12 | K = −1.68108e+00 | B = 1.95852e−02 | C = 1.12294e−02 |
| | D = −1.88170e−03 | E = 4.92681e−03 | F = 0.0 |
| R13 | K = −7.08793e+00 | B = 5.38005e−03 | C = 1.05589e−02 |
| | D = 1.11056e−02 | E = −2.16706e−03 | F = 0.0 |
| R16 | K = −1.14258e+01 | B = 4.92182e−02 | C = −2.45048e−02 |
| | D = −2.69229e−02 | E = −1.26753e−02 | F = 5.04958e−02 |

NUMERICAL VALUE EXAMPLE 5

| f = 1 to 9.69 | Fno = 1.66 to 2.96 | 2ω = 56.5 to 6.3 | |
|---|---|---|---|
| R1 = 7.738 | D1 = 0.19 | N1 = 1.846660 | ν1 = 23.9 |
| R2 = 3.634 | D2 = 0.87 | N2 = 1.696797 | ν2 = 55.5 |
| R3 = −33.635 | D3 = 0.04 | | |
| R4 = 3.274 | D4 = 0.56 | N3 = 1.696797 | ν3 = 55.5 |

-continued

| f = 1 to 9.69 | Fno = 1.66 to 2.96 | | 2ω = 56.5 to 6.3 |
|---|---|---|---|
| R5 = 7.781 | D5 = variable | | |
| R6 = 6.963 | D6 = 0.12 | N4 = 1.882997 | ν4 = 40.8 |
| R7 = 0.820 | D7 = 0.42 | | |
| R8 = −1.206 | D8 = 0.17 | N5 = 1.583126 | ν5 = 59.4 |
| R9 = 1.206 | D9 = 0.35 | N6 = 1.846660 | ν6 = 23.9 |
| R10 = 18.707 | D10 = variable | | |
| R11 = stop | D11 = variable | | |
| R12* = 1.310 | D12 = 0.82 | N7 = 1.583126 | ν7 = 59.4 |
| R13* = −3.840 | D13 = 0.04 | | |
| R14 = 1.998 | D14 = 0.13 | N8 = 1.922860 | ν8 = 18.9 |
| R15 = 1.311 | D15 = variable | | |
| R16* = 2.607 | D16 = 0.56 | N9 = 1.583126 | ν9 = 59.4 |
| R17 = −1.887 | D17 = 0.12 | N10 = 1.922860 | ν10 = 18.9 |
| R18 = −2.869 | D18 = variable | | |
| R19 = ∞ | D19 = 0.38 | N11 = 1.516800 | ν11 = 64.2 |
| R20 = ∞ | D20 = 0.15 | N12 = 1.552320 | ν12 = 63.4 |
| R21 = ∞ | D21 = 0.18 | N13 = 1.556710 | ν13 = 58.6 |
| R22 = ∞ | | | |

| Focal Length | 1.00 | 1.85 | 9.69 |
|---|---|---|---|
| Variable Spacing | | | |
| D5 | 0.12 | 1.21 | 2.82 |
| D10 | 1.45 | 0.53 | 0.15 |
| D11 | 0.30 | 0.72 | 0.17 |
| D15 | 1.09 | 0.74 | 1.36 |
| D18 | 1.19 | 1.55 | 0.93 |

*aspherical surface

Aspherical Surface Coefficients

| R12 | K = −1.63873e+00 | B = 1.80363e−02 | C = 1.10421e−02 |
|---|---|---|---|
| | D = 5.05640e−03 | E = 3.54063e+03 | F = 0.0 |
| R13 | K = −8.38054e+00 | B = 3.86287e−03 | C = 1.79560e−02 |
| | D = 1.25788e−02 | E = −1.48101e−03 | F = 0.0 |
| R16 | K = −9.78315e+00 | B = 3.45232e−02 | C = −3.08742e−02 |
| | D = 2.43287e−02 | E = −6.68163e−02 | F = 5.81092e−02 |

NUMERICAL VALUE EXAMPLE 6

| f = 1 to 9.68 | Fno = 1.66 to 2.91 | | 2ω = 56.5 to 6.3 |
|---|---|---|---|
| R1 = 7.331 | D1 = 0.19 | N1 = 1.846660 | ν1 = 23.9 |
| R2 = 3.495 | D2 = 0.88 | N2 = 1.696797 | ν2 = 55.5 |
| R3 = −48.032 | D3 = 0.04 | | |
| R4 = 3.109 | D4 = 0.58 | N3 = 1.696797 | ν3 = 55.5 |
| R5 = 7.827 | D5 = variable | | |
| R6 = 6.781 | D6 = 0.12 | N4 = 1.882997 | ν4 = 40.8 |
| R7 = 0.799 | D7 = 0.42 | | |
| R8 = −1.219 | D8 = 0.17 | N5 = 1.583126 | ν5 = 59.4 |
| R9 = 1.219 | D9 = 0.35 | N6 = 1.846660 | ν6 = 23.9 |
| R10 = 27.743 | D10 = variable | | |
| R11 = stop | D11 = variable | | |
| R12* = 1.261 | D12 = 0.89 | N7 = 1.583126 | ν7 = 59.4 |
| R13* = −3.036 | D13 = 0.04 | | |
| R14 = 1.978 | D14 = 0.13 | N8 = 1.922860 | ν8 = 18.9 |
| R15 = 1.192 | D15 = variable | | |
| R16* = 2.549 | D16 = 0.74 | N9 = 1.654115 | ν9 = 39.7 |
| R17 = −1.181 | D17 = 0.12 | N10 = 1.846660 | ν10 = 23.9 |
| R18 = −3.237 | D18 = variable | | |
| R19 = ∞ | D19 = 0.38 | N11 = 1.516800 | ν11 = 64.2 |
| R20 = ∞ | D20 = 0.15 | N12 = 1.552320 | ν12 = 63.4 |
| R21 = ∞ | D21 = 0.18 | N13 = 1.556710 | ν13 = 58.6 |
| R22 = ∞ | | | |

| Focal Length | 1.00 | 1.88 | 9.68 |
|---|---|---|---|
| Variable Spacing | | | |
| D5 | 0.12 | 1.17 | 2.62 |
| D10 | 1.56 | 0.48 | 0.15 |
| D11 | 0.31 | 0.87 | 0.17 |
| D15 | 1.06 | 0.71 | 1.32 |
| D18 | 1.07 | 1.43 | 0.82 |

*aspherical surface

Aspherical Surface Coefficients

| R12 | K = −1.61884e+00 | B = 2.09017e−02 | C = 7.98834e−03 |
|---|---|---|---|
| | D = 1.70750e−03 | E = −1.56340e+03 | F = 0.0 |
| R13 | K = −8.84974e+00 | B = 1.09873e−04 | C = 1.92843e−02 |
| | D = −2.95958e−03 | E = −2.75818e−03 | F = 0.0 |

TABLE 2

| | Numerical Value Example | | |
|---|---|---|---|
| Conditional Formula | 1 | 2 | 3 |
| (1) | 0.09 | 0.10 | 0.11 |
| (2) | 0.24 | 0.24 | 0.24 |
| (3) | 2.24 | 2.30 | 2.30 |
| (4) | 0.85 | 0.83 | 0.79 |
| (5) | 0.31 | 0.72 | 0.48 |
| (6) | 0.94 | 0.88 | 0.60 |
| (7) | 0.77 | 0.68 | 0.66 |

An embodiment of a video camera (optical device) using the zoom lens of the present invention will be described below with reference to FIGS. 25 and 26.

Figure 25:
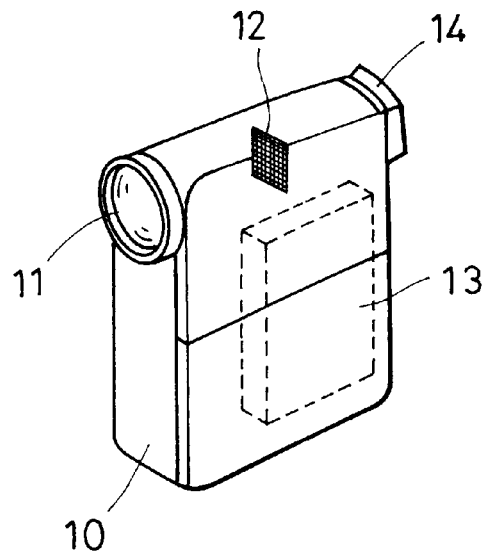
FIG. 25 is a schematic view of principal parts of an optical device according to the present invention.

In FIG. 25, numeral 10 denotes a video camera body (housing), and 11 denotes a shooting optical system constituted by the zoom lens of the present invention. Numeral 12 denotes an image pickup device, such as a CCD, for receiving light in the form of an object image through the shooting optical system 11. Numeral 13 denotes recording means for recording the object image received by the image pickup device 12, and 14 denotes a finder through which a photographer observes the object image displayed on a display device (not shown). The display device is constituted by a liquid crystal panel, for example, and displays the object image formed on the image pickup device 12.

Figure 26:
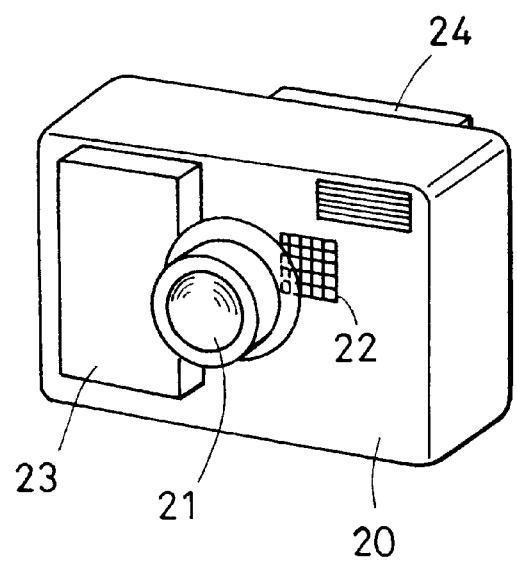
FIG. 26 is a schematic view of principal parts of another optical device according to the present invention.

In FIG. 26, numeral 20 denotes a digital still camera body (housing), and 21 denotes a shooting optical system constituted by the zoom lens of the present invention. Numeral 22 denotes an image pickup device, such as a CCD, for receiving light in the form of an object image through the shooting optical system 21. Numeral 23 denotes recording means for recording the object image received by the image pickup device 22, and 24 denotes a finder through which a photographer observes the object image displayed on a display device (not shown). The display device is constituted by a liquid crystal panel, for example, and displays the object image formed on the image pickup device 22.

Thus, a small-sized optical device having high optical performance is realized by applying the zoom lens of the present invention to an electrical camera such as a video camera and a digital still camera.

According to the present invention, as a result of properly setting moving conditions of predetermined lens units in zooming, refractive power and a lens arrangement of each lens unit, etc., a small-sized zoom lens can be obtained which has a short overall lens system and has high optical performance over a full zooming range with a simplified lens arrangement. Also, an optical device using the zoom lens can be obtained.

Further, according to the present invention, by arranging an optical system as described above, a zoom lens can be obtained which has superior characteristics; i.e., the size of an overall lens system is reduced in spite of a zoom magnification ratio being as high as on the order of 10, and the zoom lens has high optical performance and comprises fewer lenses while having a large aperture ratio, with the F-number being about 1.6.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens comprising, in order from an object side to an image plane side:
    a first lens unit having positive refractive power;
    a second lens unit having negative refractive power;
    an aperture stop;
    a third lens unit having positive refractive power and not moving for zooming;
    a fourth lens unit having positive refractive power; and
    a fifth lens unit having negative refractive power,
    wherein, in zooming from a wide-angle end to a telephoto end, (i) said second lens unit is moved toward the image plane side such that a spacing between said first lens unit and said second lens unit is increased, and (ii) said aperture stop is also moved.

2. A zoom lens according to claim 1, wherein said first lens unit is moved toward the object side in the zooming from the wide-angle end to the telephoto end.

3. A zoom lens according to claim 1, wherein said fourth lens unit is moved to compensate for a shift of an image plane upon zooming and in focusing.

4. A zoom lens according to claim 3, wherein said fourth lens unit is moved to follow a locus convex toward the object side in zooming.

5. A zoom lens according to claim 1, wherein said aperture stop is moved toward the image plane side in the zooming from the wide-angle end to the telephoto end.

6. A zoom lens according to claim 1, wherein in the zooming from the wide-angle end to the telephoto end, said aperture stop is moved toward the image plane side in the range from a medium position of a zooming range to the telephoto end.

7. A zoom lens according to claim 1, wherein in the zooming from the wide-angle end to the telephoto end, said aperture stop is moved to follow a locus that is located nearest to the object side at a medium position of a zooming range.

8. A zoom lens according to claim 1, wherein assuming that distances between said second lens unit and said aperture stop at a zoom position at which said aperture stop is positioned farthest from said third lens unit along an optical axis and the telephoto end are respectively L2s, L2t, and distances between said aperture stop and said third lens unit at said zoom position and the telephoto end are respectively Ls3, L3t, the following conditional formula is satisfied:

$$0.4 < (L2s - L2t)/(Ls3 - L3t) < 1.3.$$

9. A zoom lens according to claim 1, wherein assuming that focal lengths of the overall lens system at the wide-angle end and the telephoto end are respectively fw, ft, a focal length of said second lens unit is f2, and fA is defined as given below $$fA = \sqrt{fw \cdot ft}$$

the following conditional formula is satisfied:

$$0.19 < |f2/fA| < 0.30.$$

10. A zoom lens according to claim 1, wherein assuming that a distance from a first lens surface on the object side to a paraxial image plane is L on condition that a distance from a final lens surface to an image plane is calculated in terms of air, focal lengths of an overall lens system at the wide-angle end and the telephoto end are respectively fw, ft, and fA is defined as given below $$fA = \sqrt{fw \cdot ft}$$

the following conditional formula is satisfied in a state of focusing on an infinite object at the wide-angle end:

$$2.22 < L/fA < 3.36.$$

11. A zoom lens according to claim 1, wherein assuming amounts by which said first lens unit and said second lens unit are moved in the zooming from the wide-angle end to the telephoto end are respectively S1, S2, the following conditional formula is satisfied:

$$0.6 < S1/S2 < 1.2.$$

12. A zoom lens according to claim 1, wherein said fifth lens unit is fixed during zooming.

13. A zoom lens according to claim 1, wherein said third lens unit is moved to have a motion component in a direction perpendicular to an optical axis.

14. A zoom lens according to claim 1, wherein said second lens unit comprises a meniscus-shaped negative lens having a concave surface faced toward the image plane side, a negative lens with both surfaces being concave lens surfaces, and a cemented lens, which are arranged in this order from the object side, said cemented lens being made of a positive lens, which has a more powerful convex surface faced toward the object side than that faced toward the image plane side, and a negative lens, which are cemented to each other.

15. A zoom lens according to claim 1, wherein said second lens unit includes at least one aspherical surface.

16. A zoom lens according to claim 1, wherein assuming that average Abbe's numbers of materials of a positive lens and a negative lens in said second lens unit are respectively νp, νn, at least one of the following conditional formulae is satisfied for the average Abbe's numbers:

$$20<\nu p<35$$
$$36<\nu n<65.$$

17. A zoom lens according to claim 1, wherein assuming that an average value of refractive index of a material of a negative lens in the second lens unit is Nn, the following conditional formula is satisfied:

$$1.80<Nn<1.96.$$

18. A zoom lens according to claim 1, wherein assuming that a radius of curvature of an i-th lens surface in said second lens unit counted from the object side is R2$i$, the following conditional formula is satisfied:

$$0.60<|R22/R23|<0.82.$$

19. A zoom lens comprising, in order from an object side to an image plane side:
a first lens unit having positive refractive power;
a second lens unit having negative refractive power;
an aperture stop;
a third lens unit having positive refractive power and not moving for zooming; and
a fourth lens unit having positive refractive power,
wherein, in zooming from a wide-angle end to a telephoto end, (i) said second lens unit is moved toward the image plane side such that a spacing between said first lens unit and said second lens unit is increased, and (ii) said aperture stop is also moved, and
wherein assuming that distances between said second lens unit and said aperture stop at a zoom position at which said aperture stop is positioned farthest from said third lens unit along an optical axis and the telephoto end are respectively L2$s$, L2$t$, and distances between said aperture stop and said third lens unit at said zoom position and the telephoto end are respectively L$s$3, L3$t$, the following conditional formula is satisfied:

$$0.2<(L2s-L2t)/(Ls3-L3t)<0.9.$$

20. A zoom lens according to claim 19, wherein said first lens unit is moved toward the object side in the zooming from the wide-angle end to the telephoto end.

21. A zoom lens according to claim 19, wherein said fourth lens unit is moved in compensating for a shift of an image plane upon zooming and in focusing.

22. A zoom lens according to claim 19, wherein said fourth lens unit is moved to follow a locus convex toward the object side in zooming.

23. A zoom lens according to claim 19, wherein in the zooming from the wide-angle end to the telephoto end, said aperture stop is moved toward the image plane side in a range from a medium position of a zooming range to the telephoto end.

24. A zoom lens according to claim 19, wherein in the zooming from the wide-angle end to the telephoto end, said aperture stop is moved to follow a locus that is located nearest to the object side at a medium position of a zooming range.

25. A zoom lens comprising, in order from an object side to an image plane side:
a first lens unit having positive refractive power;
a second lens unit having negative refractive power;
an aperture stop;
a third lens unit having positive refractive power and not moving for zooming; and
a fourth lens unit having positive refractive power,
wherein, in zooming from a wide-angle end to a telephoto end, (i) said second lens unit is moved toward the image plane side such that a spacing between said first lens unit and said second lens unit is increased, and (ii) said aperture stop is also moved, and
wherein in the zooming from the wide-angle end to the telephoto end, said aperture stop is moved to follow a same locus as that of said first lens unit in a range from the wide-angle end to a medium position of a zooming range, and to follow a same locus as that of said second lens unit in a range from the medium position of the zooming range to the telephoto end.

26. A camera comprising:
a zoom lens according to claim 25; and
an image pickup device receiving light from said zoom lens.

27. A zoom lens comprising, in order from an object side to an image plane side:
a first lens unit having positive refractive power;
a second lens unit having negative refractive power;
an aperture stop;
a third lens unit having positive refractive power and not moving for zooming; and
a fourth lens unit having positive refractive power,
wherein, in zooming from a wide-angle end to a telephoto end, (i) said second lens unit is moved toward the image plane side such that a spacing between said first lens unit and said second lens unit is increased, and (ii) said aperture stop is also moved, and
wherein assuming that focal lengths of the overall lens system at the wide-angle end and the telephoto end are respectively fw, ft, a focal length of said second lens unit is f2, and fA is defined as given below $$fA=\sqrt{fw \cdot ft}$$

the following conditional formula is satisfied:

$$0.1<|f2/fA|<0.29.$$

28. A camera comprising:
a zoom lens according to claim 27; and
an image pickup device receiving light from said zoom lens.

29. A zoom lens comprising, in order from an object side to an image plane side:
a first lens unit having positive refractive power;
a second lens unit having negative refractive power;
an aperture stop;
a third lens unit having positive refractive power and not moving for zooming; and
a fourth lens unit having positive refractive power,
wherein, in zooming from a wide-angle end to a telephoto end, (i) said second lens unit is moved toward the image plane side such that a spacing between said first lens unit and said second lens unit is increased, and (ii) said aperture stop is also moved, and wherein assuming that a focal length of the overall lens system at the wide-angle end is fw and a spacing between principal points of said third lens unit and said fourth lens unit resulting in focusing on an infinite object at the telephoto end is e3T, the following conditional formula is satisfied:

$$1.79 < e3T/fw < 2.76.$$

30. A camera comprising:
a zoom lens according to claim 29; and
an image pickup device receiving light from said zoom lens.

31. A zoom lens comprising, in order from an object side to an image plane side:
a first lens unit having positive refractive power;
a second lens unit having negative refractive power;
an aperture stop;
a third lens unit having positive refractive power and not moving for zooming; and
a fourth lens unit having positive refractive power,
wherein, in zooming from a wide-angle end to a telephoto end, (i) said second lens unit is moved toward the image plane side such that a spacing between said first lens unit and said second lens unit is increased, and (ii) said aperture stop is also moved, and
wherein assuming that a focal length of an i-th lens unit is fi, the following conditional formula is satisfied:

$$0.63 < f3/f4 < 1.02.$$

32. A camera comprising:
a zoom lens according to claim 31; and
an image pickup device receiving light from said zoom lens.

33. A zoom lens comprising, in order from an object side to an image plane side:
a first lens unit having positive refractive power;
a second lens unit having negative refractive power;
an aperture stop;
a third lens unit having positive refractive power and not moving for zooming; and
a fourth lens unit having positive refractive power,
wherein, in zooming from a wide-angle end to a telephoto end, (i) said second lens unit is moved toward the image plane side such that a spacing between said first lens unit and said second lens unit is increased, and (ii) said aperture stop is also moved, and
wherein assuming amounts by which said first lens unit and said second lens unit are moved in the zooming from the wide-angle end to the telephoto end are respectively M1, M2, the following conditional formula is satisfied:

$$0.5 < M1/M2 < 1.2.$$

34. A camera comprising:
a zoom lens according to claim 33; and
an image pickup device receiving light from said zoom lens.

35. A zoom lens according to claim 19, wherein said second lens unit comprises a meniscus-shaped negative lens having a concave surface faced toward the image plane side, and a cemented lens made of a negative lens having both surfaces being concave lens surfaces and a positive lens having a convex surface faced toward the object side, which are arranged in this order from the object side.

36. A zoom lens according to claim 19, wherein said second lens unit includes at least one aspherical surface.

37. A zoom lens comprising, in order from an object side to an image plane side:
a first lens unit having positive refractive power;
a second lens unit having negative refractive power;
an aperture stop;
a third lens unit having positive refractive power and not moving for zooming; and
a fourth lens unit having positive refractive power,
wherein, in zooming from a wide-angle end to a telephoto end, (i) said second lens unit is moved toward the image plane side such that a spacing between said first lens unit and said second lens unit is increased, and (ii) said aperture stop is also moved, and
wherein assuming that for an i-th lens surface in the second lens unit counted from the object side, R2i represents a radius of curvature when the lens surface is a spherical surface and a radius of paraxial curvature when the lens surface is an aspherical surface, the following conditional formula is satisfied:

$$0.52 < |R22/R23| < 0.92.$$

38. A camera comprising:
a zoom lens according to claim 37; and
an image pickup device receiving light from said zoom lens.

39. A zoom lens comprising, in order from an object side to an image plane side:
a first lens unit having positive refractive power;
a second lens unit having negative refractive power;
an aperture stop;
a third lens unit having positive refractive power and not moving for zooming; and
a fourth lens unit having positive refractive power,
wherein, in zooming from a wide-angle end to a telephoto end, (i) said second lens unit is moved toward the image plane side such that a spacing between said first lens unit and said second lens unit is increased, and (ii) said aperture stop is also moved, and
wherein said third lens unit comprises a positive lens and a negative lens having a powerful concave surface faced toward the image plane side, which are arranged in order from the object side.

40. A camera comprising:
a zoom lens according to claim 39; and
an image pickup device receiving light from said zoom lens.

41. A zoom lens comprising, in order from an object side to an image plane side:
a first lens unit having positive refractive power;
a second lens unit having negative refractive power;
an aperture stop;
a third lens unit having positive refractive power and not moving for zooming; and a fourth lens unit having positive refractive power and including at least one negative lens, wherein, in zooming from a wide-angle end to a telephoto end, (i) said second lens unit is moved toward the image plane side such that a spacing between said first lens unit and said second lens unit is increased, and (ii) said aperture stop is also moved, and wherein said third lens unit comprises a plurality of lenses, and said third lens unit or a part of lenses of the plurality of said third lens unit is moved so as to have a motion component in a direction perpendicular to an optical axis.

42. An optical device comprising:

a zoom lens according to claim 1; and an image pickup device receiving light from said zoom lens.

43. An optical device comprising:

a zoom lens according to claim 19; and an image pickup device receiving light from said zoom lens.

44. A camera comprising:

(a) a zoom lens comprising, in order from an object side to an image plane side, (i) a first lens unit having positive refractive power (ii) a second lens unit having negative refractive power, (iii) an aperture stop, (iv) a third lens unit having positive refractive power and not moving for zooming, and (v) a fourth lens unit having positive refractive power, wherein, in zooming from a wide-angle end to a telephoto end, (i) said second lens unit is moved toward the image plane side such that a spacing between said first lens unit and said second lens unit is increased, and (ii) said aperture stop is also moved; and (b) an image pickup device receiving light from said zoom lens, wherein assuming that a shortest exit pupil position of the overall lens system in the zooming from the wide-angle end to the telephoto end and in focusing from an infinite object to a proximity object is EP, a focal length of the overall lens system at the wide-angle end is fw, an effective size of an image pickup device is LD, and a half angle $\omega w$ of a view is expressed by $$\omega w = \tan^{-1} \frac{LD}{2fw}$$

the following conditional formula is satisfied:

$$0 < |(fw \cdot \tan \omega w)/EP| < 0.13$$

* * * * *